(12) United States Patent
Andoh

(10) Patent No.: US 6,249,499 B1
(45) Date of Patent: Jun. 19, 2001

(54) OPTICAL DISC DRIVE AND METHOD OF DISCRIMINATING OPTICAL DISCS

(75) Inventor: Junichi Andoh, Chofu (JP)

(73) Assignee: Mitsumi Electric Company, Tokyo (JP)

( * ) Notice: Subject to any disclaimer, the term of this patent is extended or adjusted under 35 U.S.C. 154(b) by 0 days.

(21) Appl. No.: 09/172,472

(22) Filed: Oct. 14, 1998

(30) Foreign Application Priority Data

Oct. 15, 1997 (JP) ..................................... 9-297693

(51) Int. Cl.[7] ....................................................... G11B 7/00
(52) U.S. Cl. ................................... 369/53.22; 369/53.41; 369/53.45; 369/47.1
(58) Field of Search ................................... 369/47, 48, 49, 369/50, 54, 58, 59, 112, 116, 44.26, 44.27, 44.28, 94, 93, 53.22, 53.41, 53.45, 47.1

(56) References Cited

U.S. PATENT DOCUMENTS

| | | |
|---|---|---|
| 4,642,803 | 2/1987 | Drexler . |
| 5,410,522 | 4/1995 | Yokota et al. . |
| 5,453,607 | 9/1995 | Ando et al. . |
| 5,963,523 * | 10/1999 | Kayama et al. ................. 369/53.22 |
| 6,058,082 * | 5/2000 | Hwang ......................... 369/53.23 X |

FOREIGN PATENT DOCUMENTS 0 789 354 A2   8/1997  (EP) .
0 838 818 A2   4/1998  (EP) .

OTHER PUBLICATIONS

Patent Abstracts of Japan, Pub. No. 61137275, Jun. 24, 1986.
Patent Abstracts of Japan, Pub. No. 63103471, May 9, 1988.
Patent Abstracts of Japan, Pub. No. 04082051, Mar. 16, 1992.
Patent Abstracts of Japan, Pub. No. 06325482, Nov. 25, 1994.
Patent Abstracts of Japan, Pub. No. 08235763, Sep. 13, 1996.

* cited by examiner

Primary Examiner—Muhammad Edun
(74) Attorney, Agent, or Firm—Patents+TMS

(57) ABSTRACT

An optical disc drive which can play back or record and play back different types of optical discs having different reflectances includes a device for receiving light reflected from the loaded optical disc and detecting a quantity of the received light. The device includes circuits for amplifying the obtained signal at a first amplification level and at a second amplification level which is higher than the first amplification level. In order to discriminate a low-reflectance optical disc from a high-reflectance optical disc, the optical disc drive performs a first discriminating step for discriminating the type of the optical disc based on the signal amplified at the first amplification level; a second discriminating step for discriminating the type of the optical disc based on the signal amplified at the second amplification; and a third discriminating step for discriminating the type of the optical disc based on information carried by the optical disc to identify the type of the optical disc. By performing these steps, this optical disc drive makes it possible to discriminate the type of the optical disc easily and reliably.

18 Claims, 17 Drawing Sheets

FIG. 8

FRAME FORMAT OF 1 ATIP FRAME (42Bits 1/75sec)

| NUMBER OF BITS | 4 | 8 | 8 | 8 | 8 | 14 |
|---|---|---|---|---|---|---|
| BIT POSITION | 1234 | 111<br>56789012 | 11111112<br>34567890 | 222222222<br>12345678 | 222222222<br>12345678 | 23333333333444<br>901234567890 12 |
| DATA | Sync | Min | Sec | Frame | Frame | Error Detection Code |

FIG. 14

Q DATA 96Bits FORMAT

| Q1~Q4 | Q5~Q8 | Q9............Q80 | Q81.........Q96 |
|---|---|---|---|
| CONTROL | ADDRESS | DATA 72Bits | CRC 16Bits |

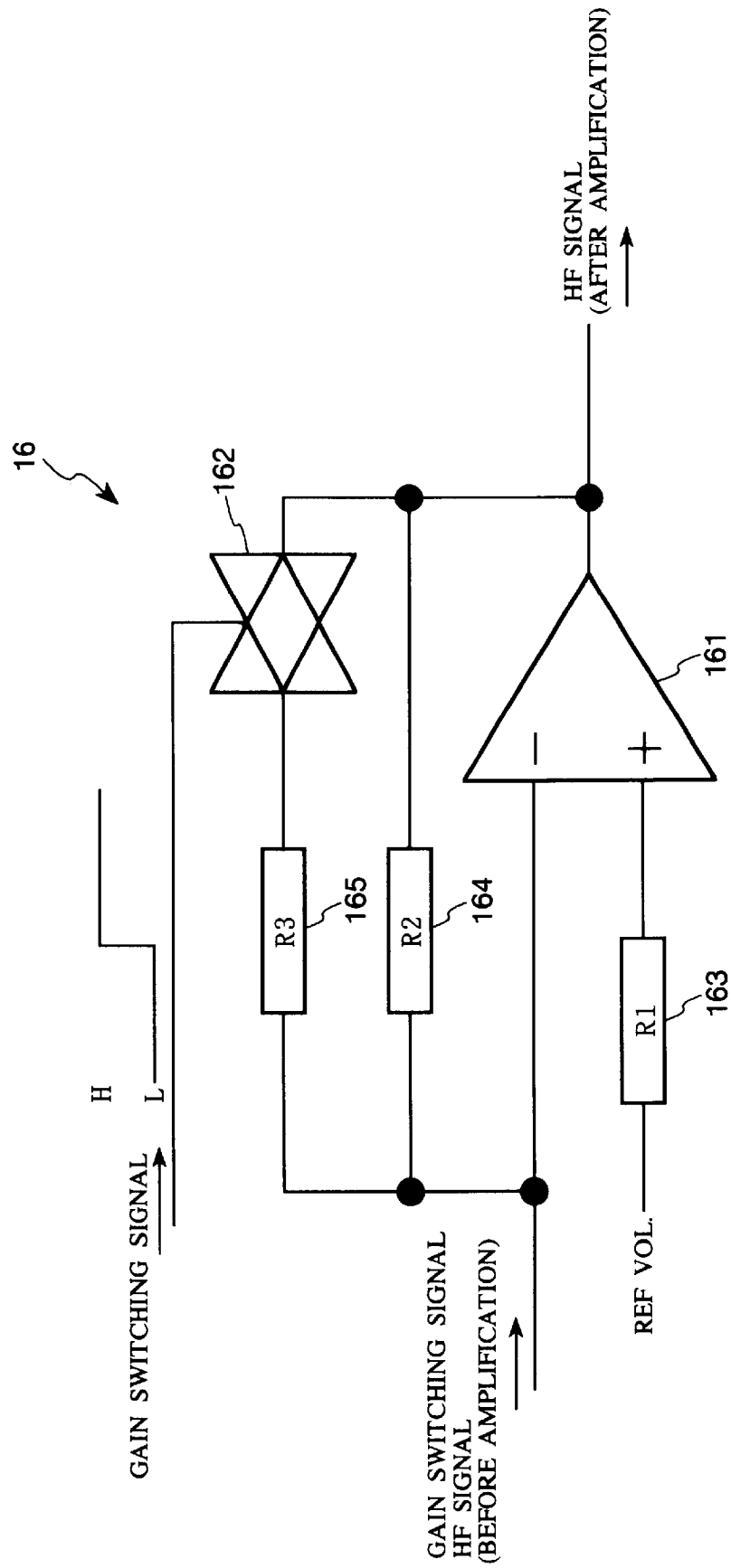

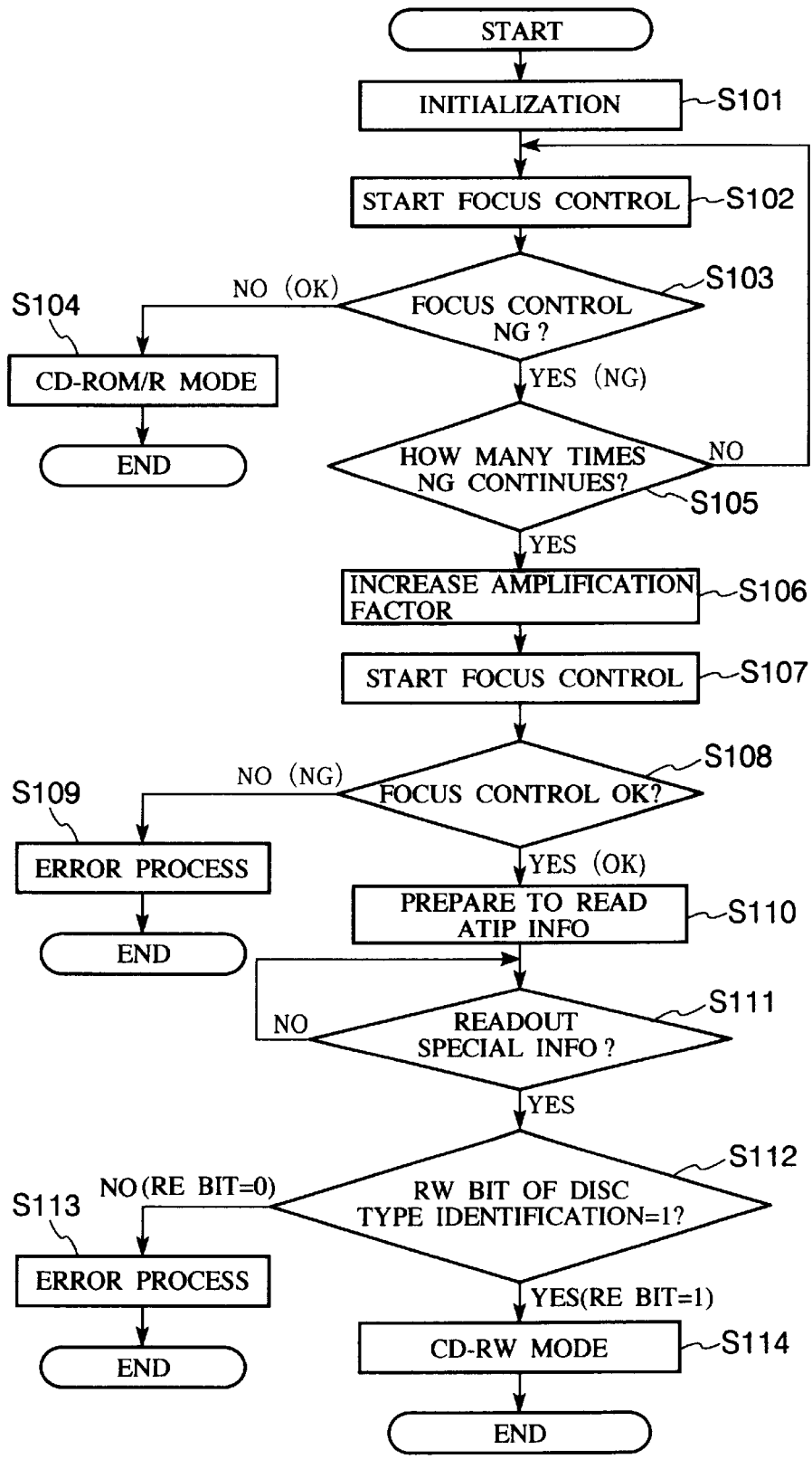

OPTICAL DISC DRIVE AND METHOD OF DISCRIMINATING OPTICAL DISCS

BACKGROUND OF THE INVENTION

1. Field of the Invention

This invention relates to an optical disc drive for playing back or recording and playing back an optical disc and a method of descriminating optical discs.

2. Description of the Prior Art

There are known optical disc drives for recording and playing back an optical disc such as a CD (compact disc), CD-ROM, CD-R (CD-Recordable) and CD-RW.

In general, due to their respective recording layer properties, the CD, CD-ROM and CD-R are classified as high-reflectance optical discs, and the CD-RW is classified as a low-reflectance optical disc.

In this connection, in recent years, optical disc drives which can playback or reproduce two or more types of the high reflectance optical discs selectively with a single optical disc drive are proposed. Examples of such optical disc drives include an optical disc drive which can playback or reproduce CD-ROM and CD-R.

However, an optical disc drive which can playback or record and playback not only the high-reflectance optical disc but also the low-reflectance optical disc with a single optical disc drive has not yet been known in the prior art.

SUMMARY OF THE INVENTION

It is therefore an object of the present invention to provide an optical disc drive which can easily and reliably playback or record and playback two or more types of optical discs having different reflectances (i.e., high-reflectance optical disc and low-reflectance optical disc).

It is another object of the present invention to provide a method of discriminating a loaded optical disc used in an optical disc drive which can play back or record and play back different types of optical discs having different reflectances.

In order to achieve the object, the present invention is directed to an optical disc drive which can play back or record and play back different types of optical discs having different reflectances. The optical disc drive comprises:

a driving mechanism for rotating an optical disc;

detecting means for receiving light reflected from the optical disc and detecting a quantity of the received light based on a signal obtained from the received light;

discriminating means for discriminating the type of the optical disc based on the obtained signal which varies by the difference between the reflectances of the optical discs.

In the present invention, the optical discs having different reflectances include a high-reflectance optical disc and a low-reflectance optical disc, and the discriminating means discriminates as to whether or not the optical disc is the high-reflectance optical disc and the low-reflectance optical disc.

It is preferred that the receiving and detecting means includes means for amplifying the obtained signal at a first amplification level and at a second amplification level which is different from the first amplification level.

In this case, the discriminating means includes first discriminating means for discriminating the type of the optical disc based on the signal amplified at the first amplification level, and second discriminating means for discriminating the type of the optical disc based on the signal amplified at the second amplification when the type of the optical disc has not been discriminated by the first discriminating means.

Further, in the present invention, the second amplification level is higher than the first amplification level, in which the first discriminating means is used for discriminating the high-reflectance optical disc and the second discriminating means is used for discriminating the low-reflectance optical disc.

In the present invention, it is also preferred that the optical disc drive further includes means for discriminating the type of the optical disc based on information carried by the optical disc to identify the type of the optical disc.

Preferably, the information is time information previously recorded on the optical disc.

Further, it is preferred that the optical disc drive further includes means for setting recording and playing back condition suitable for the finally discriminated type of the optical disc.

As described above, the optical disc drive of the present invention can playback or record and playback optical discs selected from a plurality of optical disc types having different reflectances (i.e., high reflectance optical discs and low reflectance optical discs).

In particular, because the optical disc drive includes the discriminating means for discriminating the type of the optical disc based on information carried by the optical disc to identify the type of the optical disc, it becomes possible to more reliably playback or record and playback optical discs selected from a plurality of optical disc types having the different reflectances including the high-reflectance disc and the low-reflectances optical disc.

Another aspect of the present invention is directed to an optical disc drive which can play back or record and play back different types of optical discs having different reflectances. The optical disc comprises a driving mechanism for rotating an optical disc; means for receiving light reflected from the optical disc and detecting a quantity of the received light based on a signal obtained from the received light, said means includes means for amplifying the obtained signal at a first amplification level and at a second amplification level which is higher than the first amplification level; first discriminating means for discriminating the type of the optical disc based on the signal amplified at the first amplification level; second discriminating means for discriminating the type of the optical disc based on the signal amplified at the second amplification; and third discriminating means for discriminating the type of the optical disc based on information carried by the optical disc to identify the type of the optical disc.

In the above configuration, the second discriminating means is used in the case where the first discriminating means can not discriminate the type of the optical disc, and the third discriminating means is used in the case where the second discriminating means can not discriminate the type of the optical disc.

Further, it is preferred that the first discriminating means is used for discriminating as to whether the optical disc is the high-reflectance optical disc or not, the second discriminating means is used for discriminating as to whether the optical disc is the low-reflectance optical disc or not, and the third discriminating means is used for compensating the discriminated result of the second discriminating means.

Preferably, the information is time information previously recorded on the optical disc.

Preferably, the optical disc drive further comprises means for setting recording and playing back condition suitable for the finally discriminated type of the optical disc.

Other aspect of the present inventin is directed to a method of discriminating a loaded optical disc used in an optical disc drive which can play back or record and play back different types of optical discs having different reflectances. The method comprising the steps of: receiving reflected light from the loaded optical disc to produce a signal corresponding to the quantity of the received light, the signal being amplified at a first amplification level; discriminating the type of the loaded optical disc based on the signal amplified at the first amplification level; and discriminating the type of the loaded optical disc based on the signal amplified at a second amplification level which is higher than the first amplification level.

In the above method, it is preferred that the method further comprises the step of discriminating the type of the loaded optical disc based on the information carried by the optical disc.

Further, in this method, it is preferred that the first discriminating step discriminates as to whether the optical disc is the high-reflectance optical disc or not.

Furthermore, in this method, it is preferred that the second discriminating step discriminates as to whether the optical disc is the low-reflectance optical disc or not.

Moreover, in this method, it is preferred that the third discriminating step is used for compensating the discriminated result of the second discriminating means. In this third method, the information is time information previously recorded on the optical disc.

According to these aspects of the present invention, it is also possible to discriminate the type of the optical disc, that is as to whether the loaded optical disc is a high-reflectance optical disc or a low-reflectance optical disc reliably and easily. Further, use of the information carried by the optical disc increases the reliability of the discrimination.

Other objects, structures and advantages of the present invention will be apparent when the following description of the preferred embodiment is considered taken in conjunction with the accompanying drawings.

BRIEF DESCRIPTION OF THE DRAWINGS

FIG. 8 is a chart which shows a format of an ATIP frame.

FIG. 14 is a drawing which shows a format of the Q data of 96 bits.

FIG. 16 is a block diagram which shows an example of an HF signal gain switching circuit according to the present invention.

FIG. 17 is a flow chart which shows the operations of the control means when the type of the optical disc is discriminated.

DETAILED DESCRIPTION OF THE PREFERRED EMBODIMENTS

With reference to the appended drawings, a detailed description will now be given for the preferred embodiments of an optical disc drive according to the present invention.

Figure 1:
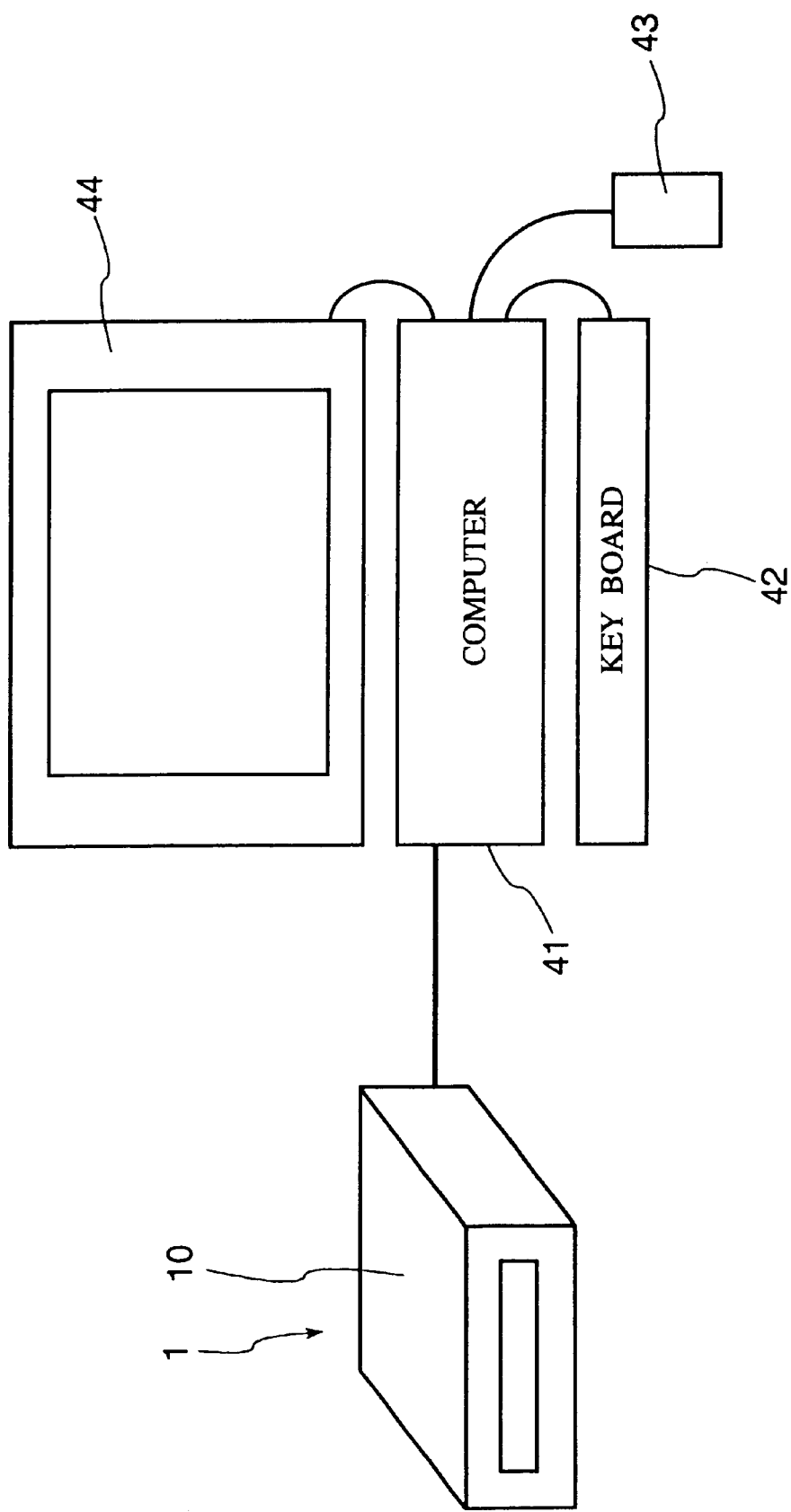
FIG. 1 is an illustration which shows a state that the optical disc drive according to the present invention is connected to an computer.
Figure 2:
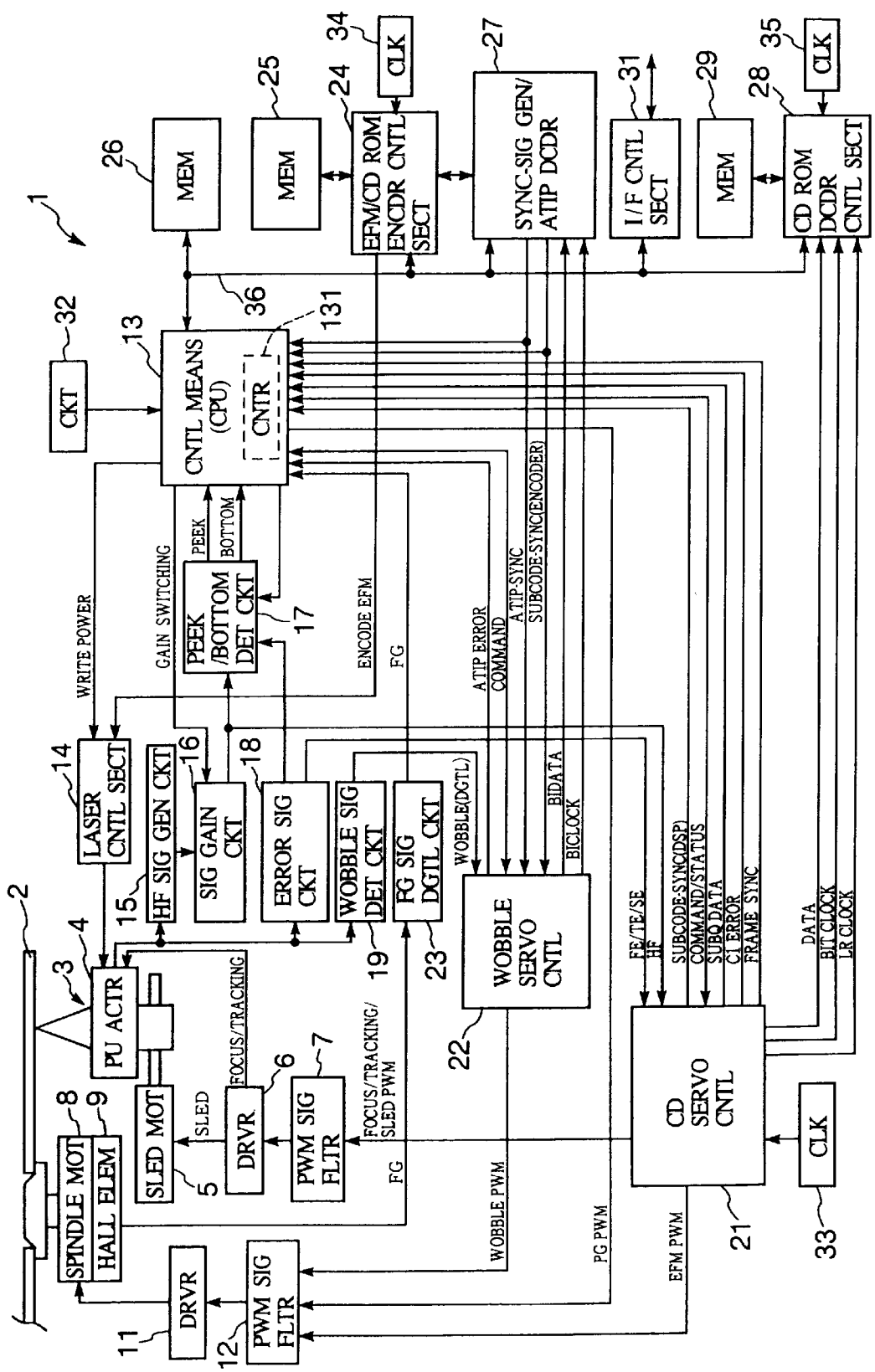
FIG. 2 is a block diagram which shows an embodiment of the optical disc drive according to the present invention.

FIG. 1 is an illustration which shows an optical disc drive 1 of the present invention in a connected state with a computer, and FIG. 2 is a block diagram which shows an embodiment of the optical disc drive 1 of the present invention.

The optical disc drive 1 shown in these drawings is capable of recording and playing back an optical disc 2 selected from a plurality of types of optical discs having different reflectances, namely, high-reflectance optical discs (CD-R and CD-ROM in the present embodiment) and low-reflectance optical discs (CD-RW in the present embodiment).

The optical disc drive 1 mentioned above is provided with an optical disc discrimination means which comprises a received light quantity detection means for detecting the quantity of light (i.e., the quantity of received light) reflected from the optical disc 2, an optical disc discrimination means for discriminating the type of the optical disc 2 (i.e., whether the optical disc 2 is a high-reflectance optical disc or a low-reflectance optical disc) and a compensation means for increasing the reliability of the discrimination results of the optical disc discrimination means, and setting means for setting appropriate conditions for recording and playing back the optical disc 2 in accordance with the type of the optical disc 2 finally determined by the optical disc discrimination means. A detailed description concerning such elements will be given later.

When the optical disc 2 is a recordable (write in) type optical disc (CD-R, CD-RW), a spiral Pre-groove (WOBBLE) not shown in the drawings is formed therein.

In optical discs 2 of the type of recorable, there is formed a spiral pre-groove (WOBBLE) which is not shown in the drawing.

The pre-groove meanders at a predetermined period (22.05 kHz at the reference rotation speed (1×)), and ATIP (Absolute Time in Pre-groove) information (time information) is previously recorded with the pre-groove. The ATIP information is recorded by being biphase modulated and frequency-modulated at a carrier frequency of 22.05 kHz.

The Pre-groove functions as a guide groove when forming pits and lands (recording pits and lands) for the optical disc 2. Further, the information recorded by the pre-groove is reproduced and then utilized to control the rotation speed of the optical disc 2 and specify a recording position (absolute time) on the optical disc 2.

The optical disc drive 1 is equipped with a turntable and a spindle motor 8 for rotating the turntable, and includes a rotation driving mechanism (not shown in the drawings) for rotating the turntable when the optical disc is loaded thereon. Further, a Hall element 9 is arranged near the spindle motor 8.

Further, the optical disc drive 1 includes an optical head (hereinafter, referred to as "optical pick-up") 3 capable of movement along a radial direction of the loaded optical disc 2 (i.e., along a radial direction of the turntable); an optical pick-up moving mechanism (not shown in the drawings) equipped with a sled motor 5 to move the optical pick-up 3, that is an optical pick-up base of the optical pick-up 3 along the radial direction of the turntable; drivers 6 and 11; PWM signal smoothing filters 7 and 12; control means 13; a laser control section 14; an HF signal generating circuit 15; an HF signal gain switching circuit 16; a peak/bottom detection circuit 17; an error signal generating circuit 18; a WOBBLE signal detection circuit 19; a CD servo controller 21; a WOBBLE servo controller 22; a FG signal digitization circuit 23; an EFM/CD-ROM encoder control section 24; memories 25, 26 and 29; a SYNC signal generating/ATIP decoder 27; a CD-ROM decoder control section 28; an interface control section 31; clocks 32, 33, 34 and 35; and a casing 10 which houses all these elements. Hereinbelow, the radial direction of the optical disc 2 along which the optical pick-up 3 is capable of moving will simply be referred to as the "radial direction."

The optical pick-up 3 includes (but not shown in the drawings) an optical pick-up base equipped with a laser diode (light source) and a photodiode (light-receiving element), and an objective lens (converging lens). The operation of the laser diode is controlled by the laser control section 14.

The objective lens is supported by suspension springs provided on the pick-up base and can be moved, with respect to the pick-up base, along the radial direction and the rotational axial direction of the optical disc 2 (i.e., the axial direction of the turntable). In this way, if the objective lens is shifted from its neutral position (central position), the restoring force of the suspension springs will bias the objective lens toward the neutral position. Hereinbelow, the rotational axial direction of the optical disc 2 will simply be referred to as "axial direction."

Further, the optical pick-up 3 includes an actuator 4 to move the objective lens respectively in the radial direction and the axial direction with respect to the pick-up base.

FIG. 16 is a block diagram (circuit diagram) which shows an example configuration of the HF signal gain switching circuit 16.

As shown in this drawing, the HF signal switching circuit 16 is constructed from a variable gain (amplification factor) differential amplifier (differential amplifier) which includes an operational amp (amplifier) 161, an analog switch 162, a resistor 163 having a resistance value R1, a resistor 164 having a resistance value R2, and a resistor 165 having a resistance value R3.

The resistors 164, 165 and the analog switch 162 are connected between the negative input terminal and the output terminal of the operational amp 161, and the resistor 163 is connected between the output of the reference voltage and the positive input terminal of the operational amp 161. In this case, the resistor 165 is connected in a series arrangement with the analog switch 162, and the resistor 165 and analog switch 162 are connected in a parallel arrangement with the resistor 164.

The analog switch 162 can be turned ON or OFF by gain switching signals from the control means 13. By turning the analog switch 162 ON or OFF, the resistor 165 is switched between a connected state (conducting state) or a disconnected state (non-conducting state).

Namely, when the level of the gain switching signal from the control means 13 is high (H), the analog switch 162 is turned ON to establish a conducting pathway through the resistor 165, whereby the amplification factor of the HF signal gain switching circuit 16 is set at an amplification factor (first amplification factor) for CD-ROM/CD-R.

On the other hand, when the level of the gain switching signal from the control means 13 is low (L), the analog switch 162 is turned OFF to place the resistor 165 in a non-conducting state, whereby the amplification factor of the HF signal gain switching circuit 16 is set at an amplification factor (second amplification factor) for CD-RW. In this connection, the amplification factor for CD-ROM/CD-R is less than the amplification factor for CD-RW.

The HF signal from the HF signal generating circuit 15 (described later) is inputted into the negative terminal of the operational amplifier 161. Then, the difference in value between the level of this HF signal and the reference voltage which is inputted into the positive input terminal of the operational amp 161 via the resistor 163 is amplified by the HF signal gain switching circuit 16, and then the amplified signal is outputted therefrom.

The control means 13 is generally constructed from a microcomputer (CPU), and it carries out control of the entire optical disc drive 1, including control of the optical pick-up 3 (actuator 4), sled motor 5, spindle motor 8, laser control section 14, HF signal gain switching circuit 16, peak/bottom detection circuit 17, CD servo controller 21, WOBBLE servo controller 22, EFM/CD-ROM encoder control section 24, memories 25, 26 and 29, SYNC signal generating/ATIP decoder 27, CD-ROM decoder control section 28, interface control section 31 and the like.

Further, addresses, data, commands and the like from the control means 13 are inputted via an address/data bus 36 to the EFM/CD-ROM encoder control section 24, memory 26, SYNC signal generating/ATIP decoder 27, CD-ROM decoder control section 28, interface control section 31 and the like.

An separate apparatus (in the present embodiment, a computer 41) can be freely connected to (and disconnected from) the optical disc drive 1 via the interface control section 31, and this makes it possible for the optical disc drive 1 and the computer 41 to communicate with each other.

As for the interface control section 31, it is possible, for example, to use an ATAPI (IDE) (ATAPI Standard), SCSI (SCSI Standard) or the like.

A keyboard 42, a mouse 43 and a monitor 44 are connected to the computer 41.

In this regard, it is to be noted that the HF signal generating circuit 15, the HF signal gain switching circuit 16, the peak/bottom detection circuit 17, the error signal generating circuit 18, the WOBBLE signal detection circuit 19, the CD servo controller 21 and the WOBBLE servo controller 22 constitute a signal processing means.

Further, the optical pick-up 3, the HF signal generating circuit 16 and the CD servo controller 21 constitute the received light detection means (detecting means as claimed).

Furthermore, the control means 13 performs most of the functions of the optical disc discriminating means, the compensating means and the setting means of the present invention.

Next, the operation of the optical disc drive 1 will be described.

While carrying out focus control, tracking control, sled control and rotation control (rotation speed control), the optical disc drive 1 records (writes in) and plays back (read out) information (data) to and from a predetermined track of the optical disc 2. Hereinbelow, the operations carried out during (1) recording, (2) playback, (3) focus control, tracking control and sled control, and (4) rotation control (rotation speed control) will be described in this order in this order.

First, as shown in FIG. 2, a predetermined C signal from the control means 13 is inputted into the CD servo controller 21. Further, a predetermined COMMAND signal from the control means 13 is inputted into the WOBBLE servo controller 22.

These COMMAND signals transmitted from the control means 13 to the CD servo controller 21 and the WOBBLE servo controller 22 are signals indicating predetermined commands (e.g., to start controls and the like).

Then, a predetermined STATUS signal from the CD servo controller 21 is inputted into the control means 13. Further, a predetermined STATUS signal from the WOBBLE servo controller 22 is inputted into the control means 13.

These STATUS signals are in response to the commands mentioned above, namely, such status signals indicate the statuses for the controls mentioned above (e.g., control success, control failure, control being carried out and other statuses).

(1) Recording

When data (signals) is to be recorded (written in) in the optical disc 2, the pre-groove formed in the optical disc 2 is reproduced (read out), after which the data is recorded in accordance with the pre-groove.

When the data (signals) to be recorded on the optical disc 2 is inputted into the optical disc drive 1 via the interface control section 31, such data is inputted into the EFM/CD-ROM encoder control section 24.

In the EFM/CD-ROM encoder control section 24, such data is encoded in response to a clock signal (i.e., at the timing of the clock signal) from the clock 34 and then undergoes modulation (EFM modulation) by a modulation method known as EFM (Eight to Fourteen Modulation) to form ENCODE EFM signals.

Figure 3:
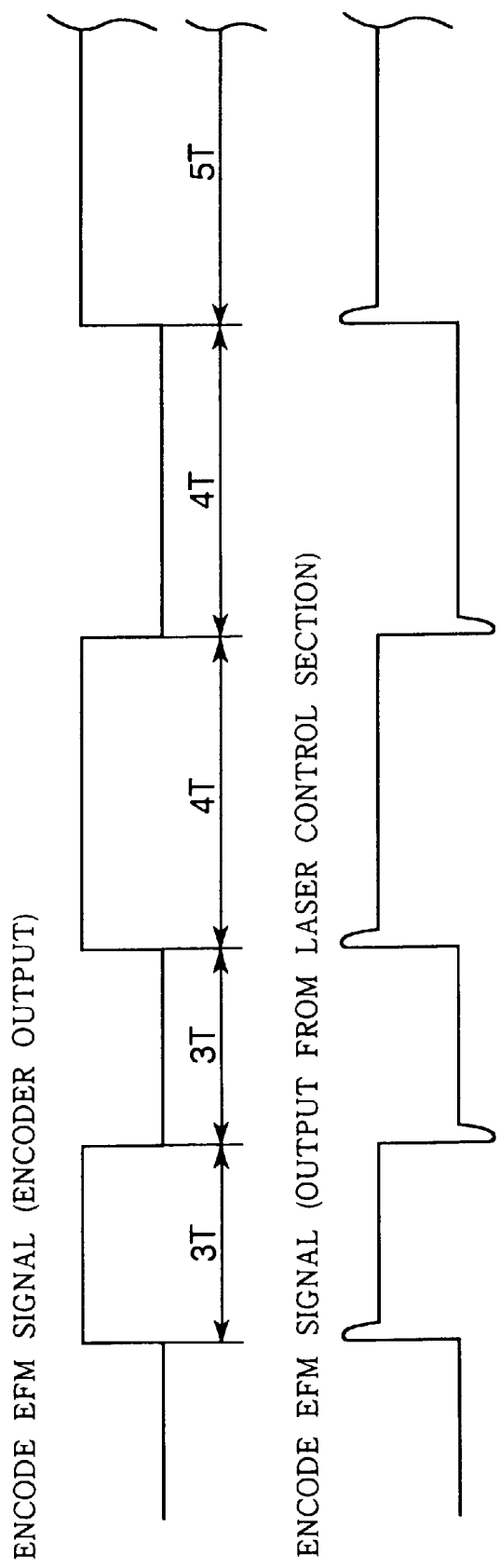
FIG. 3 is a timing chart which shows the ENCODE EFM signal from the EFM/CDROM encoder and the ENCODE EFM signal from the laser control section in the optical disc drive according to the present invention.

As shown in FIG. 3, these ENCODE EFM signals are formed from pulses each having a predetermined length (period) of any one of 3T–11T.

Figure 4:
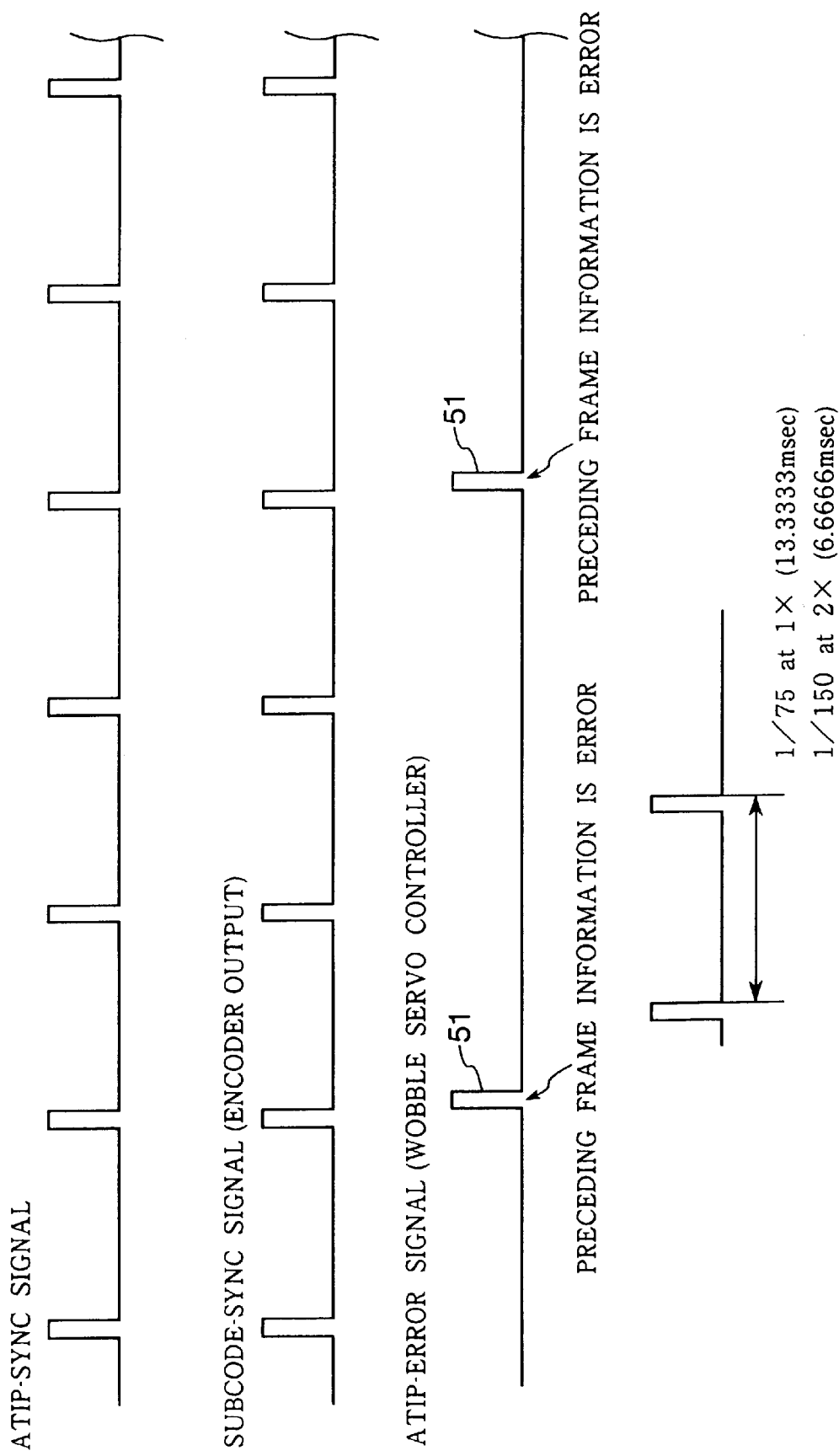
FIG. 4 is a timing chart which shows the ATIP-SYNC signal, the SUBCODE-SYNC signal from the SYNC signal generating/ATIP decoder and the ATIP error signal in the optical disc drive according to the present invention.
Figure 5:
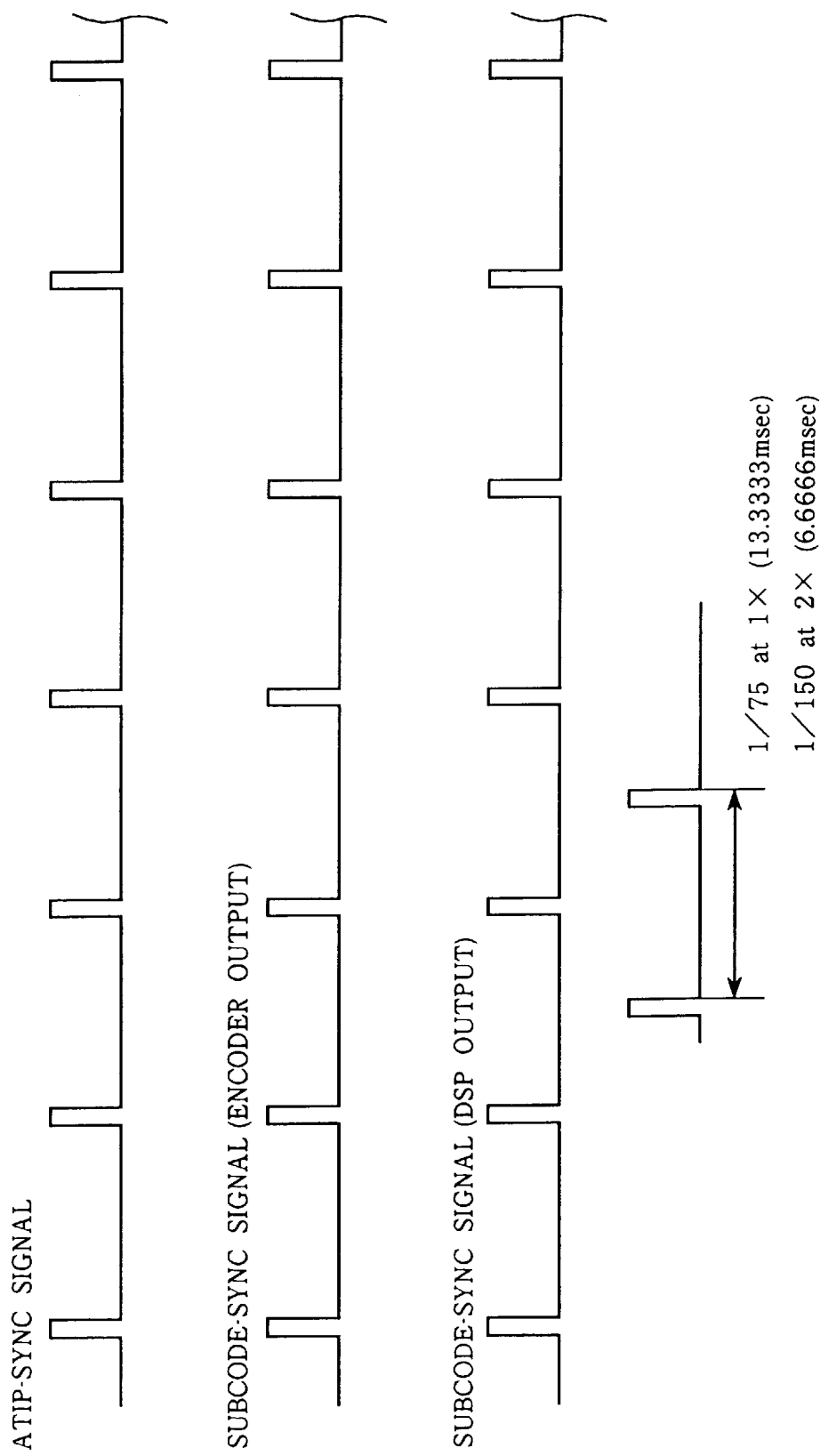
FIG. 5 is a timing chart which shows the ATIP-SYNC signal, the SUBCODE-SYNC signal from the SYNC signal generating/ATIP decoder and the SUBCODE-SYNC signal from the CD servo controller in the optical disc drive according to the present invention.

Further, as shown in FIGS. 4 and 5, in the EFM/CD-ROM encoder control section 24, the clock signal from the clock 34 is divided, and a SUBCODE-SYNC signal (used as the second synchronizing signal) formed by a predetermined period pulse is generated. The pulse period of this SUBCODE-SYNC signal (i.e., the time interval between adjacent pulses) is 1/75 second for the case of the reference rotation speed (1×).

During the encoding described above, a synchronizing signal, namely, a SYNC pattern is added to the ENCODE EFM signal based on the SUBCODE-SYNC signal (i.e., on the timing of the SUBCODE-SYNC signal). Namely, a SYNC pattern is respectively added to the portion corresponding to the head portion of each SUBCODE frame.

This ENCODE EFM signal is inputted into the laser control section 14 from the EFM/CD-ROM encoder control section 24.

Further, an analog WRITE POWER signal (voltage) is outputted from a D/A converter (not shown in the drawings) in the control means 13 and it is then inputted into the laser control section 14.

Based on the ENCODE EFM signal, the laser control section 14 switches the level of the WRITE POWER signal from the control means 13 to a high level (H) or a low level (L), and then outputs such signal, thereby controlling the operations of the laser diode of the optical pick-up 3.

In particular, during the period of time in which the ENCODE EFM signal is in a high (H) level, the laser control section 14 outputs a high level (H) WRITE POWER signal. Namely, the laser output is increased (to a level for writing in data). Then, during the period of time in which the ENCODE EFM signal is in a low (L) level, the laser control section 14 outputs a low level (L) WRITE POWER signal. Namely, the laser output is decreased (returned to a level for reading out data).

Thus, when the ENCODE EFM signal level is in the high (H) level, a pit having a predetermined length is formed in the optical disc 2, and when the ENCODE EFM signal level is in the low (L) level, a land having a predetermined length is formed in the optical disc 2.

In this way, data is written (recorded) in a predetermined track of the optical disc 2 with thus formed pits and lands.

In the EFM/CD-ROM encoder control section 24, a predetermined ENCODE EFM signal (random EFM signal) is generated in addition to the above-mentioned ENCODE EFM signal. This random EFM signal is used for output adjustment (power control) of the laser when trial writing in a test area is carried out under OPC (Optimum Power Control) procedure.

When trial writing in a test area under the OPC procedure, the random EFM signal is inputted into the laser control section 14 from the EFM/CD-ROM encoder control section 24.

Further, when trial writing is carried out in a test area during the OPC procedure, 15-step level WRITE POWER signals are generated in the control means 13, and these WRITE POWER signals are outputted from the D/A converter (not shown in the drawings) provided in the control means 13 and then inputted into the laser control section 14.

Then, based on the random EFM signal, the laser control section 14 switches the level of the WRITE POWER signals from the control means 13 to a high level (H) or a low level (L) and then outputs such signals, thereby controlling the operations of the laser diode of the optical pick-up 3. This is done for each of the 15-step level WRITE POWER signals.

In this way, in the OPC procedure, trial writing in a test area can be carried out with laser light having a 15-step output levels.

Further, when writing data in the optical disc 2, laser light at a read-out output level is emitted from the laser diode of the optical pick-up 3 onto the pre-groove of the optical disc 2, and the light reflected therefrom is received by the split photodiode of the optical pick-up 3.

Figure 6:
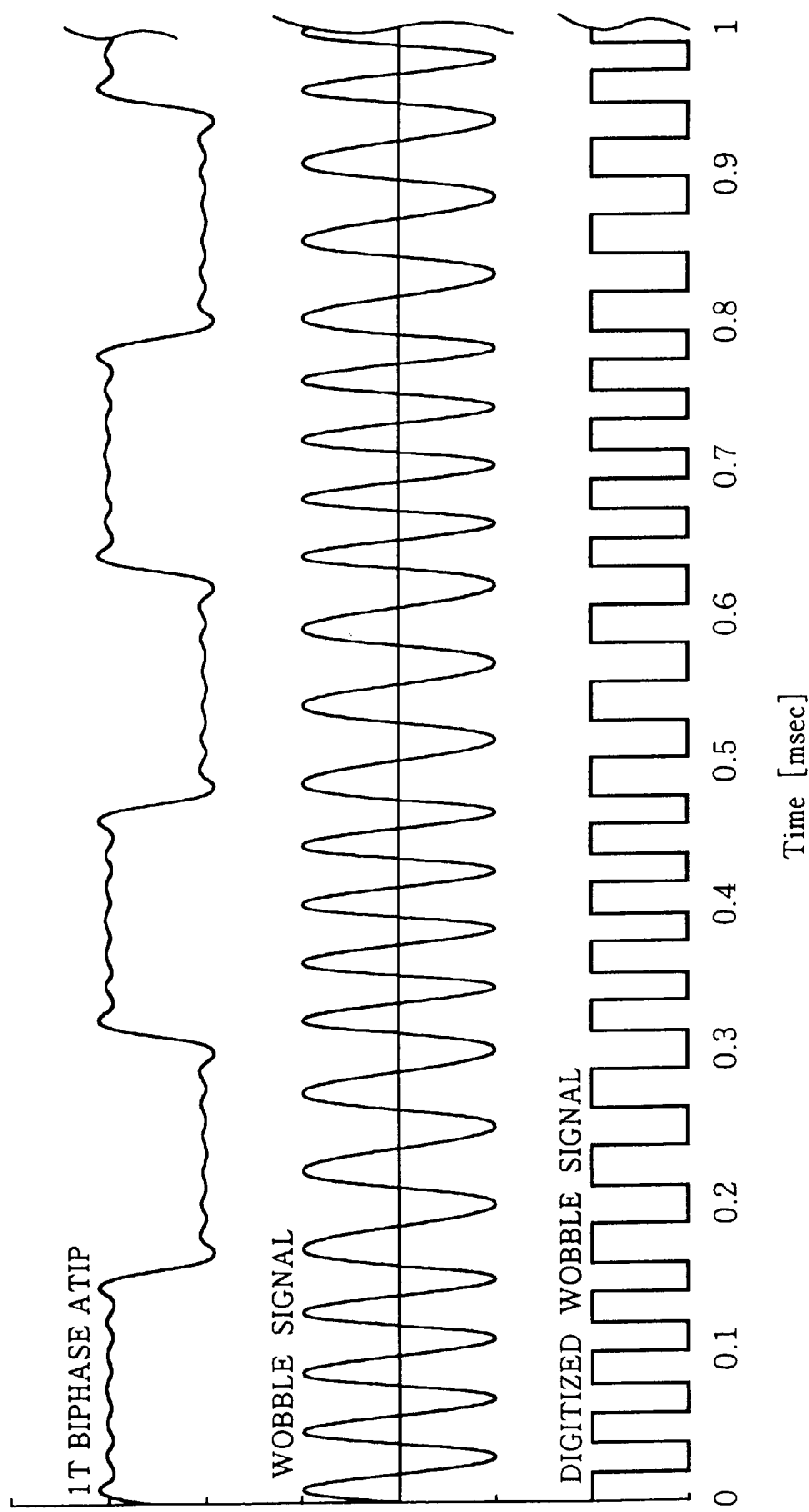
FIG. 6 is a timing chart which shows the 1T Biphase ATIP timing, the WOBBLE signal and the digitized WOBBLE signal in the optical disc drive according to the present invention.

The WOBBLE signal shown in FIG. 6 is outputted from this split photodiode. As was mentioned above, this WOBBLE signal has a 22.05 kHz frequency signal at the reference rotation speed (1×), and includes a signal obtained by biphase modulating the ATIP information and further frequency-modulating it at a carrier frequency of 22.05 kHz.

This WOBBLE signal is inputted into the WOBBLE signal detection circuit 19 where it undergoes digitization.

The digitized WOBBLE signal is then inputted into the WOBBLE servo controller 22.

Figure 7:
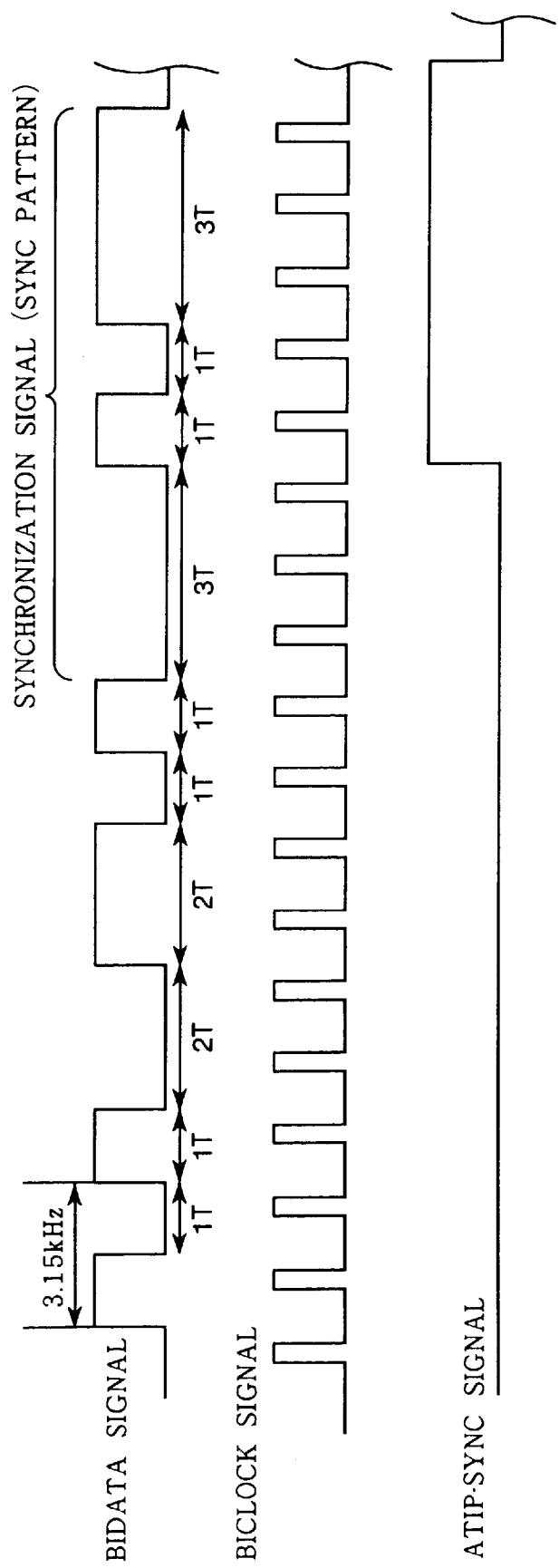
FIG. 7 is a timing chart which shows the BIDATA signal, the BICLOCK signal and the ATIP-SYNC signal in the optical disc drive according to the present invention.

In the WOBBLE servo controller 22, the frequency-modulated ATIP information in the WOBBLE signal is demodulated, and the BIDATA signal (biphase signal) shown in FIG. 7 is obtained. This BIDATA signal is a pulse signal having a length of any one of 1T–3T. Further, by biphase demodulating and then decoding this BIDATA signal, it is possible to obtain the ATIP information.

Further, in a digital PLL circuit (not shown in the drawings) provided in the WOBBLE servo controller 22, a clock is generated based on the BIDATA signal to obtain the BICLOCK signal shown in FIG. 7. This BICLOCK signal is used in timing for the decoding of the BIDATA signal (described later).

The BIDATA signal and the BICLOCK signal are respectively inputted into the SYNC signal generating/ATIP decoder 27.

In the SYNC signal generating/ATIP decoder 27, the BIDATA signal is biphase demodulated based on the BICLOCK signal, and the biphase demodulated BIDATA signal is then decoded to obtain the ATIP information. Further, the ATIP-SYNC signal (used as the first synchronizing signal) shown in FIG. 7 is also generated.

In this case, as shown in FIG. 7, the ATIP-SYNC signal pulse is generated when the SYNC pattern included in the BIDATA signal is detected. The period of this ATIP-SYNC signal pulse (i.e., the time interval between adjacent pulses) is 1/75 second for the case of the reference rotation speed (1×).

This ATIP-SYNC signal is inputted into the control means 13 and the WOBBLE servo controller 22, respectively.

Further, the decoded ATIP information is inputted into the control means 13. In this way, the control means 13 gets a position on the optical disc 2 (the absolute time) from this ATIP information.

The above-mentioned SUBCODE-SYNC signal from the EFM/CD-ROM encoder control section 24 is inputted into the SYNC signal generating/ATIP decoder 27, after which such SUBCODE-SYNC signal is respectively inputted into the control means 13 and the WOBBLE servo controller 22 from the SYNC signal generating/ATIP decoder 27.

FIG. 8 is a chart showing the frame format of the ATIP frame. As shown in this drawing, the frame format of one ATIP frame is comprised of 4-bits for synchronizing signal (Sync); 8-bits for minutes (Min); 8-bits for seconds (Sec); 8-bits for frames (Frame); and 14-bits for error detection code (CRC: Cyclic Redundancy Code).

In addition to time information (ATIP time information) which represents the absolute time on the optical disc 2, the ATIP data includes special information (ATIP special information). This special information of the ATIP data is recorded in the Lead-In Area of the optical disc 2.

The most significant bits (MSB bit 7) from each of the Minutes, Seconds and Frames of the ATIP Frame shown in FIG. 8, namely, the combination comprised of bit positions 5, 13 and 21 makes it possible to determine whether the ATIP data of the ATIP Frame is special information or time information. Further, the special information comprises a variety of data, and it is possible to determine contents and the like of such data from the combination of bits described above.

In the case where the combination of bits at the bit positions 5, 13 and 21 is "101" (Disc Type Identification), it shows that the ATIP information of the ATIP Frame is special information indicating whether or not the optical disc 2 is a CD-RW type disc. Further, when the RW bit (i.e., the bit at bit position 22) of the ATIP Frame is "1", it shows that the optical disc 2 is a CD-RW type disc, and when such RW bit is "0", it shows that the optical disc 2 is not a CD-RW type disc.

The special information which shows whether or not the optical disc 2 is a CD-RW type disc is utilized to discriminate the disc type of the optical disc 2 (as described later).

In the WOBBLE servo controller 22, the ATIP information of each of the ATIP frames undergoes an error detection process (to determine whether or not the ATIP information is wrong).

In this ATIP information error detection process, if the results of a predetermined operation performed on the data of the Sync, Minutes, Seconds and other data of the ATIP frame match the error detection code (CRC), such a state is defined as a "normal", and if the results don't match the error detection code, such a state is defined as a "ATIP error".

In this case, if it is found that the ATIP information is wrong, namely if an ATIP error is detected, a pulse 51 will be generated in the WOBBLE servo controller 22 as an ATIP error signal, and then it is outputted, as shown in FIG. 4.

The ATIP error signal which is formed from the pulse 51 is inputted into a counter (counting means) 131 provided in the control means 13. Then, the number of the pulses of the ATIP error signal is counted by the counter 131, and the number of the pulses of the ATIP error signal is defined as the number of ATIP errors.

Now, because this error detection process is carried out on the ATIP information for every ATIP frame, a maximum of 75 ATIP errors can occur in 75 ATIP frames (in one second at the reference rotation speed (1×)).

In this connection, a detection means for detecting such ATIP errors is constructed from the WOBBLE servo controller 22.

The counted value of the ATIP error is stored in the memory 26 and is also transmitted to the computer 41 via the interface control section 31 to be utilized in examining the optical disc drive 1 (to judge the recording performance of the optical disc drive 1).

The ATIP-SYNC signal inputted into the control means 13 is utilized to the timing of renewal of ATIP time.

Further, the ATIP-SYNC signal inputted into the WOBBLE servo controller 22 is used for synchronization with the SUBCODE-SYNC signal.

The SUBCODE-SYNC signal inputted into the control means 13 is used for compensation (interpolation) of the ATIP time information described hereinbelow and the measurement of the ATIP error described above.

Further, the SUBCODE-SYNC signal inputted into the WOBBLE servo controller 22 is used as a reference signal for synchronization in the same manner as the ATIP-SYNC signal described above.

In this connection, the synchronization is carried out such that the timing of the SUBCODE-SYNC signal in the EFM data generated when writing data becomes substantially synchronized with the timing of the ATIP-SYNC signal obtained from the optical disc 2.

Figure 9:
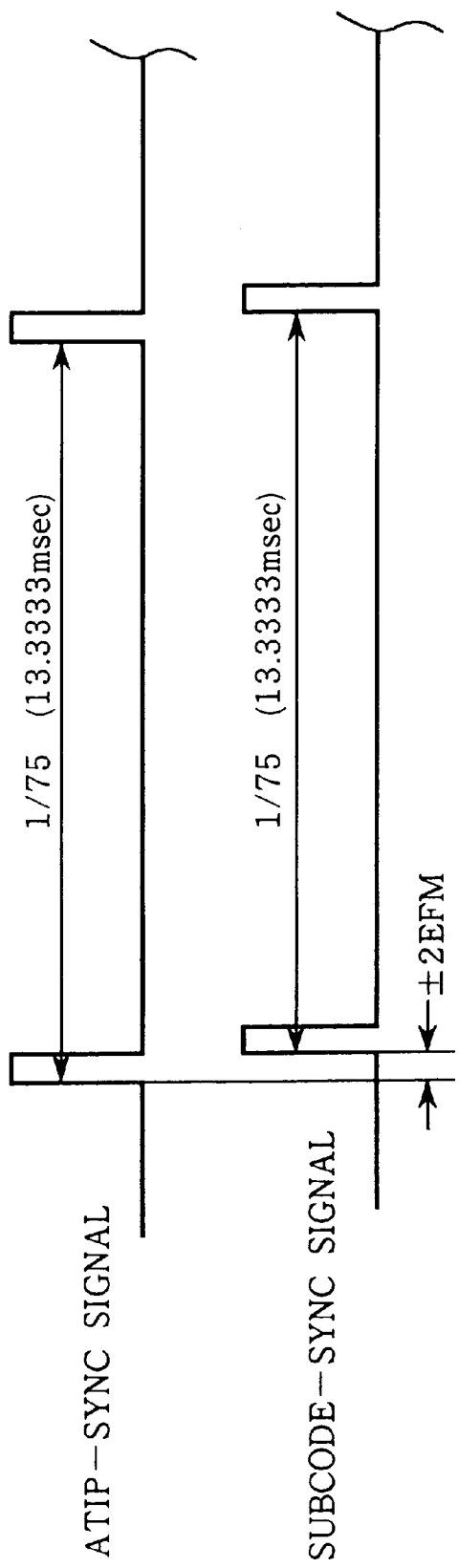
FIG. 9 is a timing chart which shows the ATIP-SYNC signal and the SUBCODE-SYNC signal in the optical disc drive according to the present invention.

As shown in FIG. 9, the SUBCODE-SYNC signal and the ATIP-SYNC signal are normally allowed to shift up to±2 EFM frames at the respective position on the entire optical disc 2.

(2) Playback

When data (signals) are to be played back (read out) from the optical disc 2, the level of the WRITE POWER signal supplied from the laser control section 14 is maintained at a predetermined DC level corresponding to a read-out output, and in this way, the laser output is maintained at the read-out output level. Normally, the read-out output (the output of the main beam) is set to be equal to or less than 0.7 mW.

Now, when data is being read out from the optical disc 2, laser light at the read-out output is emitted from the laser diode of the optical pick-up 3 onto a predetermined track of the optical disc 2, and the light reflected therefrom is received by the split photodiode of the optical pick-up 3.

Then, electrical currents (voltages) corresponding to the quantity of received light are outputted respectively from each light-receiving portion of the split photodiode of the optical pick-up 3, and these currents, namely, each signal (detected signal) is respectively inputted into the HF signal generating circuit 15 and the error signal generating circuit 18.

In the HF signal generating circuit 15, these detection signals undergo addition, subtraction and the like to generate an HF (RF) signal.

This HF signal is an analog signal corresponding to pits and lands formed in the optical disc 2.

As described above, this HF signal is inputted into the HF signal gain switching circuit 16 and then amplified. The amplification factor of the HF signal gain switching circuit 16 is switched by a gain switching signal from the control means 13.

The amplified HF signal (hereafter, referred to as the "HF signal") is respectively inputted into the peak/bottom detection circuit 17 and the CD servo controller 21.

Further, a tracking error (TE) signal (which is described under (3) Focus Control, Tracking Control and Sled Control) is inputted into the peak/bottom detection circuit 17.

Figure 10:
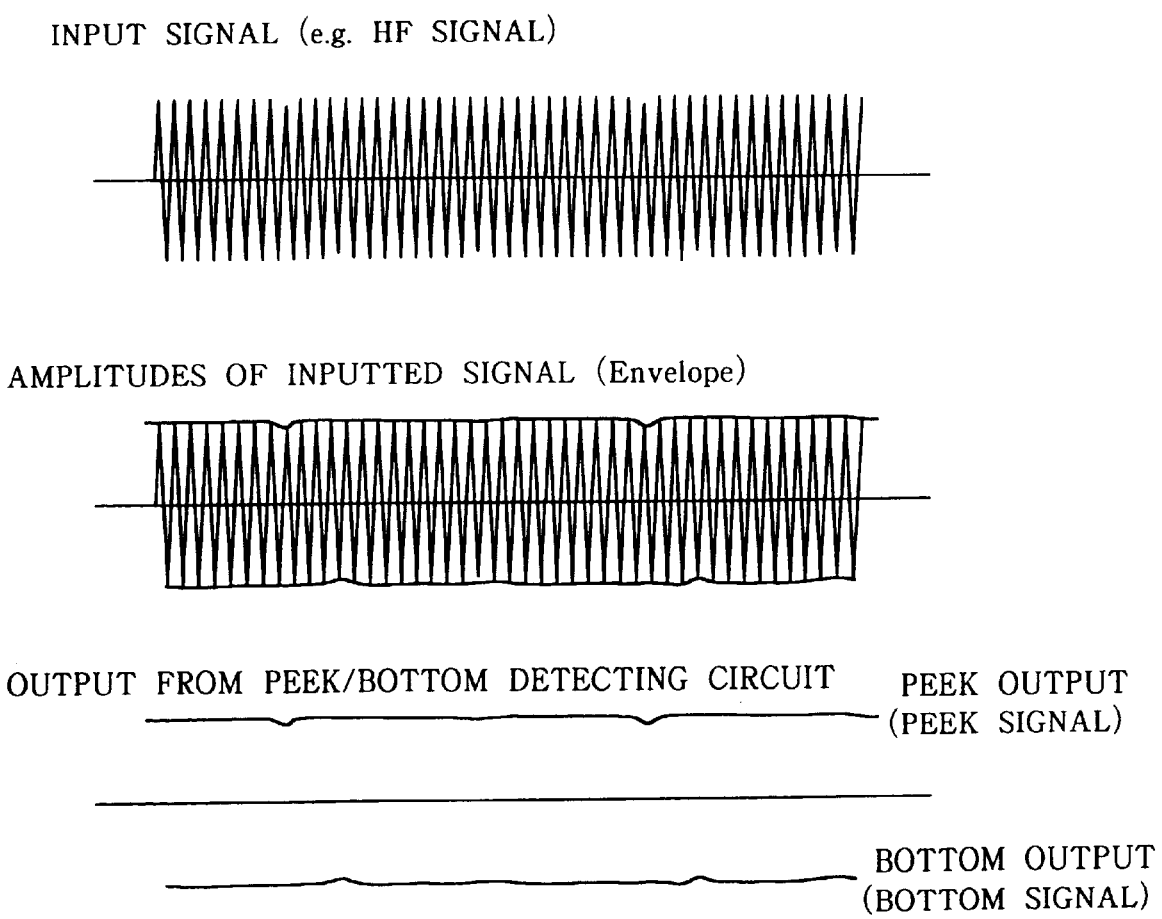
FIG. 10 is a timing chart which shows an input signal inputted to the peek/bottom detecting circuit, the amplitudes of the inputted signal (envelope), and the PEEK signal and the BOTTOM signal in the optical disc drive according to the present invention.

As shown in FIG. 10, in the peak/bottom detection circuit 17, the amplitudes of the inputted signals (envelope), such as the HF signal and the tracking signal, are extracted.

The top and bottom of the amplitude are referred to respectively as the "PEAK" and "BOTTOM", wherein the signal corresponding to the tops of the amplitudes is referred to as "PEEK signal", and the signal corresponding to the bottoms of the amplitudes is referred to as "BOTTOM signal".

The PEEK signal and the BOTTOM signal are respectively inputted into the A/D converter (not shown in the drawings) in the control means 13, and in this A/D converter such signals are converted into digital signals.

These PEAK and BOTTOM signals are used, for example, to measure the amplitude, to adjust the amplitude of the tracking error signal, to calculate the β value in the OPC (Optimum Power Control) procedure, and to determine the presence or absence of the HF signal.

In the CD servo controller 21, the HF signal is digitized and EFM demodulated to obtain an EFM signal. This EFM signal is a signal formed by a pulse having a length (period) corresponding to any one of 3T–11T.

Then, in the CD servo controller 21, an error correction (CIRC error correction) which uses an error correction code referred to as a CIRC (Cross Interleaved Read Solomon Code) is carried out twice on this EFM signal.

In this case, the first CIRC correction is referred to as a "C1 error correction", and the second CIRC correction is referred to as the "C2 error correction".

Further, the case where error correction can not be carried out by the first CIRC correction, namely by the C1 error correction is referred to as a "C1 error", and the case where error correction can not be carried out by the second CIRC correction, namely by the C2 error correction is referred to as a "C2 error".

Figure 11:
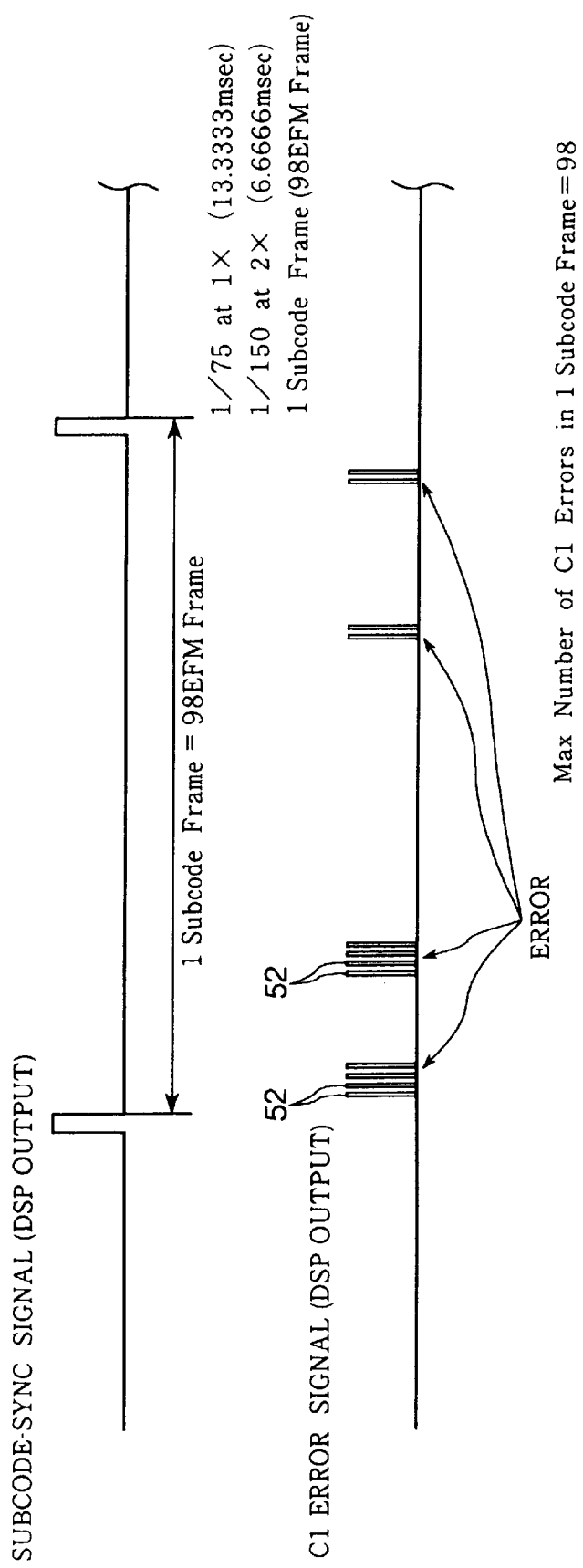
FIG. 11 is a timing chart which shows the SUBCODE-SYNC signal from the CD servo controller and the C1 ERROR signal in the optical disc drive according to the present invention.

As shown in FIG. 11, if a C1 error is detected during the C1 error correction in the CD servo controller 21, a pulse 52 is generated and then it is outputted.

The C1 error signal comprised of the pulses 52 is inputted into the counter 131 of the control means 13. Then, the number of the pulses of the C1 error signal is counted (measured) by the counter 131 as the number of C1 errors.

Now, because one SUBCODE frame is comprised of 98 EFM frames, a maximum number of 7350 C1 and C2 errors can occur respectively in 75 SUBCODE frames (in one second at the reference rotation speed (1×))

In this regard, it is to be understood that the CD servo controller 21 constitutes a detection means for detecting the C1 error.

The counted value of C1 errors is stored in the memory 26 and is also transmitted to the computer 41 via the interface control section 31 to be utilized in examining the optical disc drive 1 (to judge the playback performance or the recording/playback performance of the optical disc drive 1).

In the CD servo controller 21, the EFM signal after CIRC error correction has been carried out is decoded (converted) into a predetermined format data, namely, a DATA signal.

Next, a description will be given for a typical case in which audio data (music data) is recorded on an optical disc 2 and its EFM signal is decoded into an audio format DATA signal.

Figure 12:
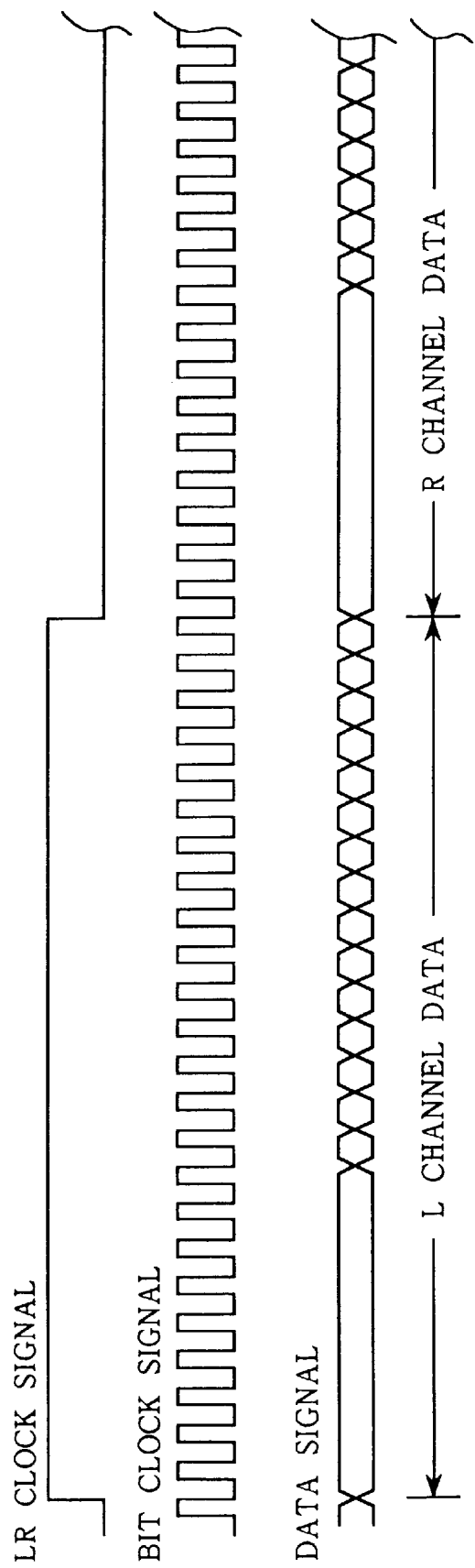
FIG. 12 is a timing chart which shows the DATA signal of an audio format, the LRCLOCK signal and the BITCLOCK signal in the optical disc drive according to the present invention.

In this connection, FIG. 12 is a timing chart showing an audio format DATA signal, an LRCLOCK signal and a BITCLOCK signal.

As shown in this drawing, in the CD servo controller 21, the EFM signal is decoded into a DATA signal comprised of 16-bit L-channel data and 16-bit R-channel data based on a clock signal from the clock 33.

Further, in the CD servo controller 21, the BITCLOCK signal and the LRCLOCK signal are respectively generated based on the clock signal from the clock 33. This BIT-CLOCK signal is a serial data transfer clock.

Further, the LRCLOCK signal is a signal for discriminating the L-channel data and the R-channel data in the DATA signal. In this case, the high (H) level of the LRCLOCK signal represents the L-channel data, and the low (L) level of the LRCLOCK signal represents the R-channel.

Now, in the case where normal data other than audio data is recorded on the optical disc 2, the EFM signal thereof is also decoded into a DATA signal comprised of the above-mentioned 16-bit L-channel data and 16-bit R-channel data.

The DATA signal, the LRCLOCK signal and the BIT-CLOCK signal are respectively inputted into the CD-ROM decoder control section 28.

In the case where error correction information such as ECC (Error Correction Code) /EDC (Error Detecting Code) is recorded on the optical disc 2, error correction is carried out for the DATA signal in the CD-ROM decoder control section 28.

This ECC/EDC is an error correction code used in a CD-ROM MODE 1 format. With this error correction, it is possible to reduce the bit error rate to a degree of $10^{-12}$.

Next, in the CD-ROM decoder control section 28, the DATA signal is decoded into predetermined format data for communication (transmission) based on the clock signal from the clock 35, and this decoded data is then transmitted to the computer 41 via the interface control section 31.

In the computer 41, for example, this decoded data is encoded, and then this encoded data is recorded (copied) into a predetermined recording medium (e.g., a hard disc).

Figure 13:
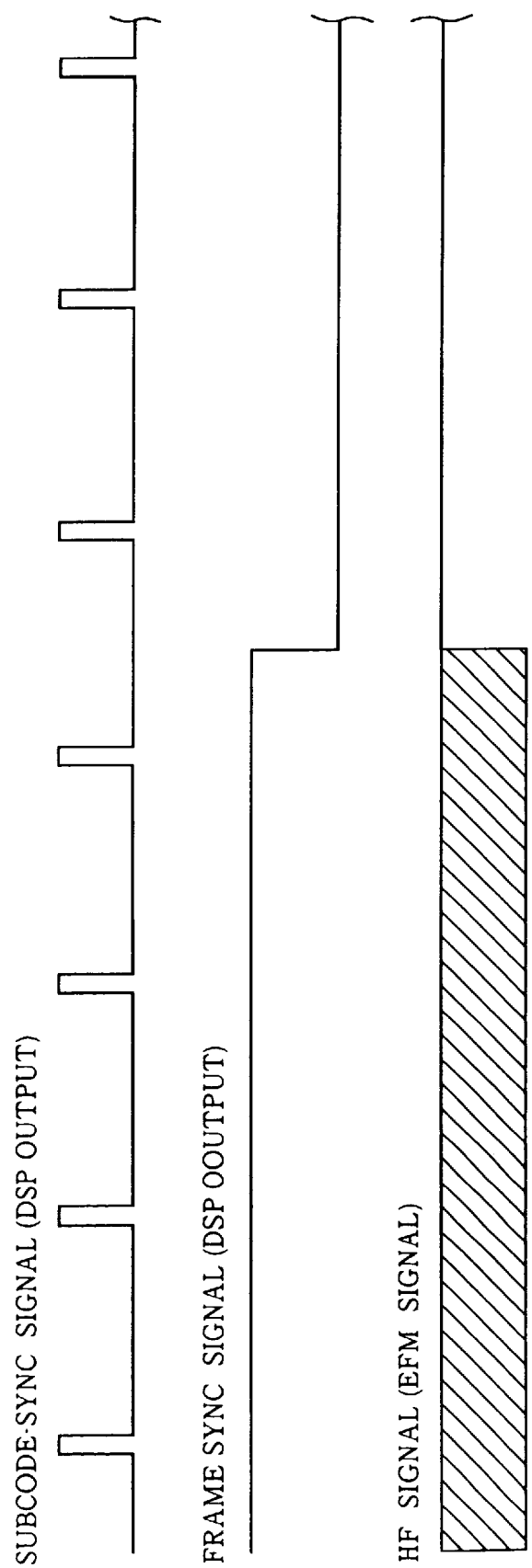
FIG. 13 is a timing chart which shows the SUBCODE-SYNC signal from the CD servo controller, the FRAM SYNC signal, the HF signal (EFM signal) in the optical disc drive according to the present invention.

Further, the FRAME SYNC signal shown in FIG. 13 is generated in the CD servo controller 21.

The level of this FRAME SYNC signal becomes high (H) when the HF signal is inputted into the CD servo controller 21 and the EFM signal is being synchronized at a specified period (3T–11). Further, if no HF signal becomes inputted (i.e., if there becomes no synchronization of the EFM signal), the level of the FRAME SYNC signal is switched from a high (H) level to a low (L) level at the respective EFM frame unit.

In this regard, it is to be understood that, in the case of the reference rotation speed (1×), the length (period) of one EFM frame is 136 $\mu$sec, and 98 EFM frames form one subcode frame.

This FRAME SYNC signal is inputted into the control means 13, and it is used for detecting the termination of the HF signal.

Further, a SUBQ DATA signal is inputted into the control means 13 from the CD servo controller 21.

This SUBQ DATA signal is a signal which represents Q data in the subcode data.

The subcode includes eight types referred to as P, Q, R, S, T, U, V and W. One EFM frame includes a subcode of one byte in which each of P–W data is recorded with one bit, respectively.

Now, because one subcode frame is comprised of 98 EFM frames, with each EFM frame having one bit for each P–W data, there are a total of 98 bits for each P–W data in one subcode frame. However, because the first two EFM frames are used for the SYNC pattern (synchronization signal), there are actually 96 bits for each P–W data.

Next, FIG. 14 is a chart showing the format of the 96 bits of Q data. The CONTROL given by Q1–Q4 (4 bits) shown in this drawing are used to discriminate normal data or audio data.

Further, the ADDRESS given by Q5–Q8 (4 bits) represents the contents of the data in Q9–Q80 (72 bits).

Further, the CRC (Cyclic Redundancy Code) in Q81–Q96 (16 bits) is used to detect errors (to judge whether or not the data is wrong).

Furthermore, from this Q data it is possible to obtain information such as the absolute time information on the optical disc 2, the information of the present track, lead-in and lead-out, the music number, and a TOC (Table of Contents) recorded in the lead-in area.

The control means 13 obtains such information from the Q data and then carries out predetermined operations.

Further, the SUBCODE-SYNC signal is inputted into the control means 13 from the CD servo controller 21.

Figure 15:
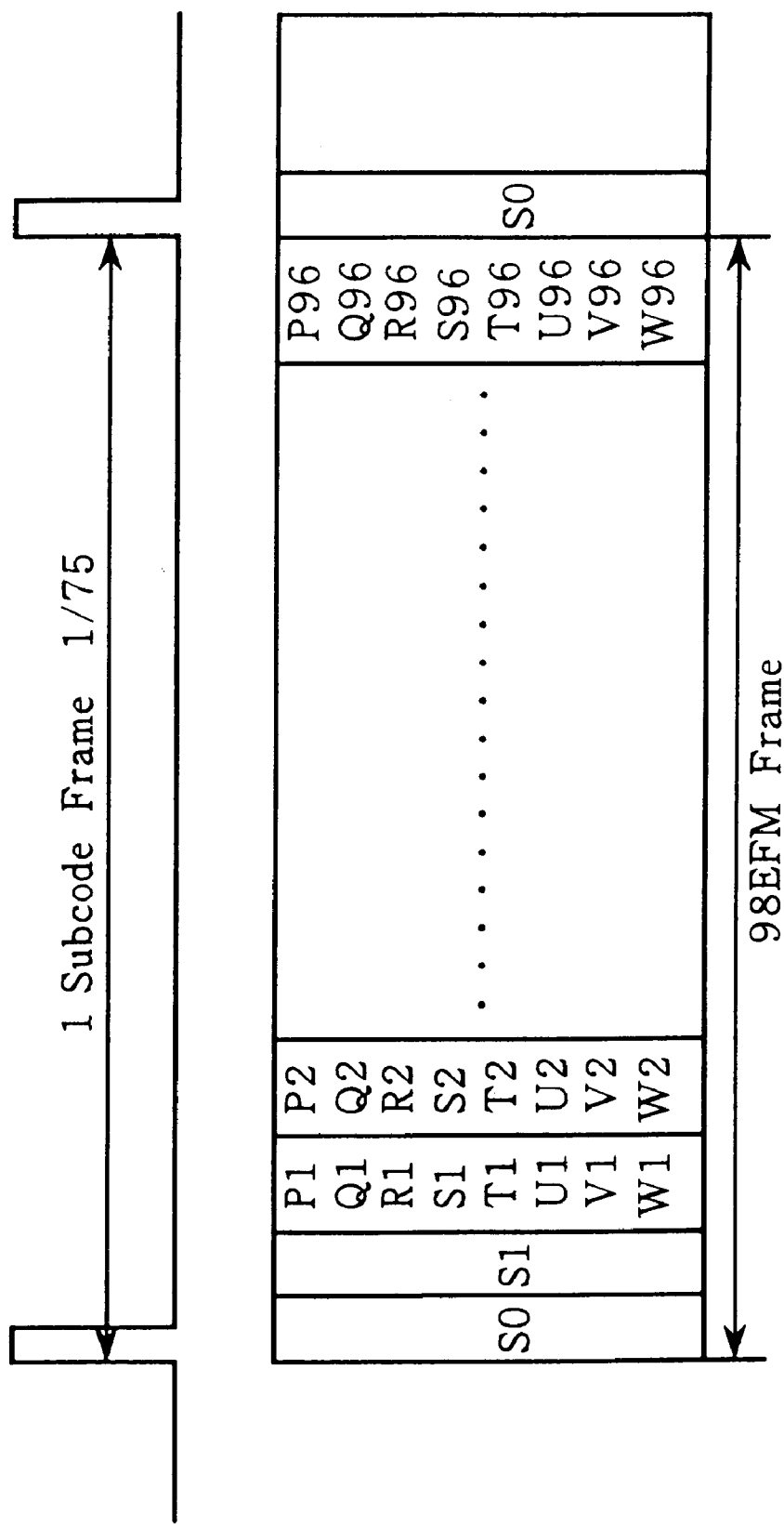
FIG. 15 is a drawing which shows one SUBCODE frame.

Now, as shown in FIG. 15, there are 98 bytes of subcode data in 98 EFM frames, and as mentioned above, the SYNC pattern (synchronization signal) is recorded in the two bytes which form the first two EFM frames, namely, S0 and S1.

When this SYNC pattern is detected, the CD servo controller 21 generates a pulse and then outputs it. Namely, a pulse is generated and outputted for every subcode frame (98 EFM frames). The signal which is formed by this pulse is the SUBCODE-SYNC signal. Further, the SYNC pattern is outputted 75 times every second in the case of the reference rotation speed (1×).

Further, in the CD servo controller 21, the Q data is renewed after the SUBCODE-SYNC signal pulse has been detected. Then, the renewed Q data is read into the control means 13.

(3) Focus Control, Tracking Control and Sled Control

In the error signal generating circuit 18, a focus error (FE) signal, a tracking error (TE) signal and a sled error (SE) signal are respectively generated by carrying out addition and subtraction and the like on the detection signal from the split photodiode.

The focus error signal is a signal which represents the amount of displacement of the objective lens along the rotational axial direction away from the focus position (i.e., the amount of the displacement of the objective lens from the focus position) and the direction thereof.

The tracking error signal is a signal which represents the amount of displacement of the objective lens along a radial direction from the center of the track (Pre-groove) (i.e., the amount of the displacement of the objective lens from the center of the track) and the direction thereof.

Further, the sled error signal is a signal used for sled control, namely, in the sled servo (i.e., the servo for moving the pick-up base of the optical pick-up 3). In other words, the sled error signal is a signal which represents the amount of the displacement of the optical pick-up 3 along a radial direction (i.e., the moving direction of the optical pick-up 3) from the target position (proper position) of the optical pick-up 3 and the direction thereof.

The focus error signal is inputted into the CD servo controller 21. Further, the tracking error signal is also inputted into the CD servo controller 21 and into the peak/bottom detection circuit 17, respectively, as described above. Furthermore, the sled error signal is also inputted into the CD servo controller 21.

Using these focus error signal, tracking error signal and sled error signal, the optical disc drive 1 carries out focus control, tracking control and sled control for a predetermined track.

During focus control, a focus PWM (Pulse Width Modulation) signal for controlling the driving of the actuator 4 along the rotational axial direction is generated in the CD servo controller 21. This focus PWM signal is a digital signal (continuous pulse).

The focus PWM signal is inputted into the PWM signal smoothing filter 7 from the CD servo controller 21 and undergoes smoothing, namely, the focus PWM signal is converted into a control voltage (control signal), and it is then inputted into the driver 6. Then, based on such control voltage, the driver 6 applies the focus signal (predetermined voltage) to the actuator 4 to drive the actuator 4 in the rotational axial direction (focus direction).

In this case, the CD servo controller 21 adjusts the pulse width (duty ratio) of the focus PWM signal so that the level of the focus error signal becomes zero (i.e., the level is reduced as much as possible), and reverses the code of the focus PWM signal (pulse/minus sign). In this way, the objective lens of the optical pick-up 3 is positioned at the focus position. Namely, the focus servo is engaged.

Further, during tracking control, a tracking PWM signal for controlling the driving of the actuator 4 along the radial direction is generated in the CD servo controller 21. This tracking PWM signal is also a digital signal (continuous pulse).

The tracking PWM signal is inputted into the PWM signal smoothing filter 7 from the CD servo controller 21 and undergoes smoothing, namely, the tracking PWM signal is converted into a control voltage (control signal), and it is then inputted into the driver 6. Then, based on such control voltage, the driver 6 applies the tracking signal (predetermined voltage) to the actuator 4 to drive the actuator 4 in the radial direction (tracking direction).

In this case, the CD servo controller 21 adjusts the pulse width (duty ratio) of the tracking PWM signal so that the level of the tracking error signal becomes zero (namely, the level is reduced as much as possible), and reverses the code of the tracking PWM signal (pulse/minus sign). In this way, the objective lens of the optical pick-up 3 is being positioned at the center of the track (Pre-groove). Namely, the tracking servo is engaged.

Further, during the sled control, a sled PWM signal for controlling the driving of the sled motor 5 is generated in the CD servo controller 21. This sled PWM signal is also a digital signal (continuous pulse).

The sled PWM signal is inputted into the PWM signal smoothing filter 7 from the CD servo controller 21 and undergoes smoothing, namely, the sled PWM signal is converted into a control voltage (control signal), and it is then inputted into the driver 6. Then, based on such control voltage, the driver 6 applies the sled signal (predetermined voltage) to the sled motor 5 to rotationally drive the sled motor 5.

In this case, the CD servo controller 21 adjusts the pulse width (duty ratio) of the sled PWM signal so that the level of the sled error signal becomes zero (i.e., to reduce the level as much as possible), and reverses the code of the sled PWM signal (pulse/minus sign). In this way, the pick-up base of the optical pick-up 3 is positioned at the target position (proper position). Namely, the sled servo is engaged.

Further, in addition to tracking control, the tracking error signal is also used, for example, to control the movement of the optical pick-up 3 toward a predetermined track (target track) of the optical disc 2 (i.e., to control track jump operations).

(4) Rotation Number Control (Rotation Speed Control)

In the optical disc drive, the rotation number (rotation speed) of the spindle motor 8 is controlled during recording or playback so that the linear velocity becomes constant. The methods of controlling this rotation number include a method using a WOBBLE PWM (Pulse Width Modulation) signal, namely, a spindle servo (WOBBLE servo) which uses the WOBBLE signal; a method using an FG PWM signal, namely, a spindle servo (FG servo) which uses an FG signal; and a method using an EFM PWM signal, namely, a spindle servo (EFM servo) which uses the EFM signal. These will be described below in the order mentioned above.

The WOBBLE PWM signal is a signal for controlling the spindle motor, and it is generated by the WOBBLE servo controller 22. The WOBBLE PWM signal is a digital signal (continuous pulse) having a level of 0–5V.

This WOBBLE PWM signal is inputted into the PWM signal smoothing filter 12 from the WOBBLE servo controller 22 and undergoes smoothing, namely, the WOBBLE PWM signal is converted into a control voltage (control signal), and it is then inputted into the driver 11. Then, based on such control voltage, the driver 11 rotationally drives the spindle motor 8.

In this case, the WOBBLE servo controller 22 adjusts the pulse width (duty ratio) of the WOBBLE PWM signal so that the frequency (period) of the WOBBLE signal becomes the target value (e.g., 22.05 kHz at the reference rotation speed (1×)). In this way, the spindle servo is engaged to set the rotation number (rotation speed) of the spindle motor 8 at the target value.

The FG PWM signal is a signal for controlling the spindle motor, and it is generated by the control means 13. The FG PWM signal is a digital signal having a level of 0–5V (continuous pulse).

This FG PWM signal is inputted into the PWM signal smoothing filter 12 from the control means 13 and undergoes smoothing, namely, the FG PWM signal is converted into a control voltage (control signal), and it is then inputted into the driver 11. Then, based on such control voltage, the driver 11 rotationally drives the spindle motor 8.

On the other hand, a FG (Frequency Generator) signal corresponding to the rotation number (rotation speed) of the spindle motor 8 is outputted from the Hall element 9. This FG signal is digitized by the FG signal digitization circuit 23 and such a digitized signal is then inputted into a frequency measurement (period measurement) section (not shown in the drawings) of the control means 13.

In the frequency measurement section of the control means 13, the frequency (period) of the FG signal is measured based on the clock signal from the clock 32. Then, the control means 13 adjusts the pulse width (duty ratio) of the FG PWM signal so that the frequency (period) of the FG signal becomes the target value. In this way, the spindle servo is engaged to set the rotation number (rotation speed) of the spindle motor 8 at the target value.

The EFM PWM signal is a signal for controlling the spindle motor, and it is generated by the CD servo controller 21. The EFM PWM signal is a digital signal having a level of 0–5V level (continuous pulse).

This EFM PWM signal is inputted into the PWM signal smoothing filter 12 from the CD servo controller 21 and undergoes smoothing, namely, the EFM PWM signal is converted into a control voltage (control signal), and it is then inputted into the driver 11. Then, based on such control voltage, the driver 11 rotationally drives the spindle motor 8.

In this case, the CD servo controller 21 adjusts the pulse width (duty ratio) of the EFM signal so that the EFM signal, that is a period of a predetermined pulse selected from the 3T–11T period pulses becomes the target value in anywhere on the optical disc. In this way, the spindle servo is engaged to set the rotation number (rotation speed) of the spindle motor 8 at the target value.

In this connection, it should be understood that in carrying out the spindle servo, any one of the methods mentioned above can be selectively used.

In the optical disc drive 1, the type of the optical disc 2 is discriminated by the optical disc discrimination means, and the reliability of the discrimination results of the optical disc discrimination means is increased by the compensation means. Then, conditions related to recording or playback are set by the setting means in accordance with the discriminated disc type of the optical disc 2. These operations are described below.

In this connection, FIG. 17 is a flow chart showing the control operations of the control means 13 when the disc type of the optical disc 2 is being discriminated. Hereinbelow, a description is made with regard to this flow chart.

This program, namely, the routine (CD-RW detection routine) for discriminating the disc type of the optical disc 2 is executed when a disc tray (not shown in the drawings) for moving the optical disc 2 is positioned at a loading position.

First, an initialization is carried out (Step 101). In this initialization step, each of the parameters is initialized. Further, the gain switching signal is set at a high (H) level, and the analog switch 162 of the HF signal gain switching circuit 16 is turned ON. Namely, the amplification factor of the HF signal gain switching circuit 16 is set at the CD-ROM/CD-R amplification factor (i.e., the first amplification factor).

Next, at the same time the spindle motor 8 is driven, the laser diode of the optical pick-up 3 is driven (lighted), and then with the output of the laser diode maintained at a read-out output level, a focus control (first focus control) is started (Step 102).

In this focus control, the objective lens of the optical pick-up 3 is first moved to a position closest to the optical disc 2, and then the objective lens of the optical pick-up 3 is moved in a direction away from the optical disc 2.

At this time, in the CD servo controller 21, the HF signal from the HF signal gain switching circuit 16 is compared with a threshold value (threshold voltage value), and then a focus OK signal (FOK signal) is generated and outputted. In the case where the HF signal level exceeds the threshold value, the focus OK signal is given a high (H) level, and in the case where the HF signal level is equal to or less than the threshold value, the focus OK signal is given a low (L) level.

This focus OK signal is one of the STATUS signals described above, and it is then inputted into the control means 13 from the CD servo controller 21.

In this connection, when the objective lens of the optical 3 approaches the focusing position of the objective lens (hereafter, referred to as the "focusing position"), the HF signal level suddenly rises and reaches a maximum when the objective lens reaches the focusing position.

Further, the circuit constants such as the resistance values R1–R3 of the resistors 163–165 of the HF signal gain switching circuit 16, namely, the amplification factor for CD-ROM/CD-R (i.e., the first amplification factor) and the amplification factor for CD-RW (i.e., the second amplification factor), and the threshold value are respectively preset so as to satisfy the following conditions. Namely, in the case where the objective lens of the optical pick-up 3 is at or near the focusing position, the level of the HF signal after amplification of the HF signal obtained from a normal CD-ROM and CD-R at the amplification factor for CD-ROM/CD-R is sufficiently greater than the threshold value, the level of the HF signal after amplification of the HF signal obtained from a normal CD-RW at the amplification factor for CD-ROM/CD-R is sufficiently smaller than the threshold value, and the level of the HF signal after amplification of the HF signal obtained from a normal CD-RW at the amplification factor for CD-RW is sufficiently greater than the threshold value; and in the case where the objective lens of the optical pick-up 3 is moved away from the focusing position or away from a position near the focusing position, the levels of the HF signals after amplification of the HF signals obtained from normal CD-ROM, CD-R and CD-RW at the amplification factor for CD-RW are sufficiently smaller than the threshold value.

Accordingly, when a normal CD-ROM or CD-R is loaded into the optical disc drive 1, the focus OK signal is first at a low (L) level, and then when the objective lens approaches the focusing position (i.e., reaches a position near the focusing position), the focus OK signal level becomes high (H).

In this focus control, when the focus OK signal level becomes high (H), the pules width (duty ratio) of the focus PWM signal is adjusted as well as the code bit of the focus PWM signal (sign) is reversed so that the level of the focus error signal becomes zero (i.e., is reduced as much as possible) after the zero cross point of the focus error signal (S curve).

In this way, when the focus servo is engaged and a focusing state is obtained, the focus OK signal is maintained at a high (H) level.

On the other hand, if the focus servo is not engaged and a focusing state is not obtained, the focus OK signal is changed from a high (H) level to a low (L) level, and then the focus OK signal is maintained at this low (L) level. Further, there are cases in which the focus OK signal is maintained at a low level without ever being set at a high (H) level.

In Step 103 (described below), if the focus OK signal is maintained at a high (H) level for a predetermined period of time, a focus control OK judgement is made, namely it is determined that a focusing state has been obtained by engagement of the focus servo. On the other hand, if such a high (H) level is not maintained for the predetermined time period, a focus control NG judgement is made, namely, it is determined that a focusing state has not been obtained due to no focus servo being engaged.

Further, in this focus control, it is possible to move the optical pick-up 3 in a direction approaching the optical disc 2 after having moved the objective lens of the optical pick-up 3 to the furthest position from the optical disc 2.

Next, a judgement is carried out to determine whether or not a focus control NG is present, namely, whether or not a focusing state has not been obtained (Step 103).

In the case where a focus control OK is judged to exist in Step 103, namely, in the case where it is determined that a focusing state has been obtained, a CD-ROM/CD-R mode is established (Step 104).

By establishing this CD-ROM/CD-R mode, controls such as tracking control, sled control and rotation number control (rotation speed control) are started.

In the CD-ROM mode, it is possible to carry out playback for CD-ROM and recording/playback for CD-R.

Now, in the case where the focus control is OK in Step 103, it is determined that a normal CD-ROM or a normal CD-R is loaded in the optical disc drive 1 (i.e., the loaded optical disc 2 is discriminated as being a normal CD-ROM or a normal CD-R).

Further, in the case where the focus control is judged to be NG in Step 103, namely, in the case where it is judged that the focusing state has not been obtained, a judgement is carried out to determine whether or not how many times (N times) NG occurs continuously in the focus control (Step 105).

In the case where it is judged at Step 105 that there is no N times continuous NG in the focus control, the routine returns to Step 102 and then the steps after Step 102 are executed again.

Further, in the case where it is judged at Step 105 that there is N times continuous NG in the focus control, the amplification factor of the HF signal gain switching circuit 16 is increased (Step 106). In this Step 106, the gain switching signal is set at a low (L) level, and the analog switch 162 of the HF signal gain switching circuit 16 is turned OFF. Namely, the amplification factor of the HF signal gain switching circuit 16 is set at the amplification factor for CD-RW (i.e., the second amplification factor).

Next, as described previously, the focus control (i.e., the second focus control) is started (Step 107).

In this focus control, when a normal CD-R is loaded, the focus OK signal is initially at a low (L) level, but when the objective lens of the optical pick-up 3 approaches the focusing position (i.e., when the objective lens is positioned near the focusing position), the focus OK signal is switched to a high (H) level.

Then, in the same manner as described above, in Step 108 (described below), if the focus OK signal is maintained at a high (H) level for a prescribed period of time, a focus control OK judgement is made, namely, it is judged that a focusing state has been obtained by engagement of the focus servo. On the other hand, if such a high (H) level is not maintained for the prescribed time period, a focus control NG judgement is made, namely, it is judged that a focusing state has not been obtained due to no engagement of the focus servo.

Next, a judgement is carried out to determine whether or not the focus control is NG, namely, whether or not a focusing state has been obtained (Step 108).

Then, in the case where it is judged at Step 108 that the focus control is NG, namely, in the case where it is judged that the focusing state has not been obtained, an error process is carried out (Step 109).

In this error process, for example, the driving of the laser diode of the optical pick-up 3 is stopped (turned off) and the driving of the spindle motor 8 is also stopped. In addition, a predetermined alarm (warning) may be carried out, if necessary.

In this connection, it is to be noted that in the case where the focus control is NG at Step 108, it is determined (discriminated) that an abnormal optical disc such as an abnormal CD-ROM, abnormal CD-R or abnormal CD-RW is loaded to no optical disc is loaded.

Further, in the case where the focus control is OK at Step 108, namely, in the case where it is judged that a focusing state has been obtained, preparations are carried out for reading out the ATIP data (Step 110).

In Step 110, the optical pick-up 3 is moved to the Lead-in Area of the optical disc 2 in order to read out the special information from the ATIP data. Further, tracking control, sled control and rotation number control (rotation speed control) are respectively carried out.

Next, the optical pick-up 3 attempts to read out the special information, and a judgement is made as to whether or not this special information has been read out (Step 111).

In the case where it is judged that the special information has been read out in Step S111, the RW bit of the above-described Disc type identification is read out, and then a judgement is made as to whether or not this RW bit equals 1 (Step 112).

In the case where it is judged that the RW bit equals zero in Step 112, an error process is carried out (Step 113).

In this error process, for example, the driving of the laser diode of the optical pick-up 3 is stopped (turned off) and the driving of the spindle motor 8 is also stopped. In addition, a predetermined alarm (warning) may be carried out, if necessary.

Now, in the case where the RW bit equals zero in Step 112, it is determined (discriminated) that an optical disc other than a CD-RW, such as an abnormal CD-R or the like, is loaded in the optical disc drive 1. Namely, Step 112 makes it possible to prevent establishment of the CD-RW mode when an optical disc other than a CD-RW, such as an abnormal CD-R or the like, is loaded in the optical disc drive 1.

Further, in the case where it is judged that the RW bit equals 1 in Step 112, the CD-RW mode is established (Step 114).

In this CD-RW mode, for example, data which represents that the loaded optical disc is CD-RW is added (written) into the status information (i.e., information representing whether or not the loaded optical disc is a CD-RW) which his transmitted to the computer 41 from the interface control portion 31. In this case, because the error rate increases in the case where a CD-RW is played back, the playback speed (rotation speed) is lowered in order to prevent such an increase in the error rate. Further, this information which represents whether or not the load optical disc is a CD-RW is utilized, for example, to make a judgement as to whether or not the playback speed should be lowered. In this CD-RW mode, it is possible to carry out recording and playback of a CD-RW.

Now, in the case where the RW bit equals 1 in Step S112, it is recognized that a normal CD-RW is loaded (i.e., the loaded optical disc 2 is discriminated as being a normal CD-RW). At this point, the program is ended.

As described above, the optical disc drive 1 can record and playback optical discs 2 having different reflectances, namely, CD-ROM, CD-R and CD-RW.

In this regard, it is to be noted that in the case where the disc type of the loaded optical disc 2 is discriminated only by the focus control OK/NG (i.e., by the amount of received light reflected from the optical disc 2), there is a case that a dirty CD-ROM and CD-R or a poorly written CD-ROM and CD-R are mistakenly discriminated as a CD-RW. However, in the disc drive 1 of the present invention, after using the focus control OK/NG to discriminate the disc type of the optical disc 2, the special information in the ATIP data is utilized to carry out another discrimination (i.e., a plurality of different discrimination methods are carried out), which makes it possible to improve the reliability of the discrimination results. For this reason, the present invention can carry out more reliable recording/playback operations for different types of optical discs such as CD-ROM, CD-R and CD-RW.

Further, in the optical disc drive 1, because the operation for discriminating whether the loaded optical disc 2 is either a CD-ROM or CD-R or a CD-RW is carried out automatically to establish a playback or recording mode suitable for the discriminated disc type of the optical disc 2, the operations of the optical disc drive 1 are easily carried out, and this makes it possible to carry out more reliable recording/playback for CD-ROM, CD-R and CD-RW.

Furthermore, it should be noted that even though the optical disc drive of the present invention was described with reference to the embodiment shown in the drawings, the present invention is not limited to such structure, and it is possible to replace the various elements described above with any element capable of performing the same or similar functions.

Further, even though the present embodiment described above is an optical disc drive for recording and playing back optical discs, the present invention also makes it is possible to construct an optical disc drive only for playing back optical discs.

Further, even though the high reflectance optical discs were described in the present embodiment as being CD-ROM or CD-R, the present invention is not limited to such discs, and it is possible to use other discs such as a CD (compact disc) or the like.

Further, even though the low reflectance optical disc was described in the present embodiment as being a CD-RW, the present invention is not limited to a CD-RW.

Further, the optical disc drive of the present invention may be constructed so as to be able to playback or record and playback more than two types or more than four types of optical disc.

Finally, it should be also noted that even though the optical disc drive of the present invention was described with reference to the embodiment shown in the drawings, the present invention is not limited thereto, and any additions or changes may be made without departing from the scope of the following claims.

What is claimed is:

1. An optical disc drive which can play back or record and play back different types of optical discs having different reflectances, the optical disc drive comprising:

a driving mechanism for rotating an optical disc;

signal generating means for receiving light reflected from the optical disc to generate a signal responsive to a quantity of the received light which varies due to the respective reflectances of the optical discs;

amplifying means for amplifying the generated signal, the amplifying means including means for amplifying the obtained signal at a first amplification level and at a second amplification level which is different from the first amplification level; and discriminating means for discriminating the type of the optical disc based on the amplified signal by the amplifying means.

2. The optical disc drive as claimed in claim 1, wherein the optical discs having different reflectances include a high-reflectance optical disc and a low-reflectance optical disc, and said discriminating means discriminates as to whether or not the optical disc is the high-reflectance optical disc and the low-reflectance optical disc.

3. The optical disc drive as claimed in claim 1, wherein the discriminating means includes first discriminating means for discriminating the type of the optical disc based on the signal amplified at the first amplification level, and second discriminating means for discriminating the type of the optical disc based on the signal amplified at the second amplification when the type of the optical disc has not been discriminated by the first discriminating means.

4. The optical disc drive as claimed in claim 3, wherein the second amplification level is higher than the first amplification level, in which the first discriminating means is used for discriminating the high-reflectance optical disc and the second discriminating means is used for discriminating the low-reflectance optical disc.

5. The optical disc drive as claimed in claim 1, further comprising means for discriminating the type of the optical disc based on information carried by the optical disc to identify the type of the optical disc.

6. The optical disc drive as claimed in claim 5, wherein the information is time information previously recorded on the optical disc.

7. The optical disc drive as claimed in claim 1, further comprising means for setting recording and playing back condition suitable for the finally discriminated type of the optical disc.

8. An optical disc drive which can play back or record and play back different types of optical discs having different reflectances, the optical disc drive comprising:

a driving mechanism for rotating an optical disc;

signal generating means for receiving light reflected from the optical disc to generate a signal responsive to a quantity of the received light which varies due to the respective reflectances of the optical discs;

amplifying means for amplifying the generated signal, the amplifying means including means for amplifying the obtained signal at a first amplification level and at a second amplification level which is higher than the first amplification level;

first discriminating means for discriminating the type of the optical disc based on the signal amplified at the first amplification level;

second discriminating means for discriminating the type of the optical disc based on the signal amplified at the second amplification; and third discriminating means for discriminating the type of the optical disc based on information carried by the optical disc to identify the type of the optical disc.

9. The optical disc drive as claimed in claim 8, wherein the second discriminating means is used in the case where the first discriminating means cannot discriminate the type of the optical disc, and the third discriminating means is used in the case where the second discriminating means can not discriminate the type of the optical disc.

10. The optical disc drive as claimed in claim 8, wherein the optical discs having different reflectances include a high-reflectance optical disc and a low-reflectance optical disc, in which the first discriminating means is used for discriminating as to whether the optical disc is the high-reflectance optical disc or not, the second discriminating means is used for discriminating as to whether the optical disc is the low-reflectance optical disc or not, and the third discriminating means is used for compensating the discriminated result of the second discriminating means.

11. The optical disc drive as claimed in claim 8, wherein the information is time information previously recorded on the optical disc.

12. The optical disc drive as claimed in claim 8, further comprising means for setting recording and playing back condition suitable for the finally discriminated type of the optical disc.

13. A method of discriminating a loaded optical disc used in an optical disc drive which can play back or record and play back different types of optical discs having different reflectances, the method comprising the steps of:

receiving reflected light from the loaded optical disc to generate a signal responsive to the quantity of the received light, the signal being amplified at a first amplification level;

discriminating the type of the loaded optical disc based on the signal amplified at the first amplification level; and discriminating, in a case where the type of the optical disc has not been discriminated based on the signal amplified at the first amplification level, the type of the loaded optical disc based on the signal amplified at a second amplification level which is higher than the first amplification level.

14. The method as claimed in claim 13, further comprising the step of discriminating the type of the loaded optical disc based on the information carried by the optical disc.

15. The method as claimed in claim 13, wherein the optical discs having different reflectances include a high-reflectance optical disc and a low-reflectance optical disc, in which the first discriminating step discriminates as to whether the optical disc is the high-reflectance optical disc or not.

16. The method as claimed in claim 15, wherein the second discriminating step discriminates as to whether the optical disc is the low-reflectance optical disc or not.

17. The method as claimed in claim 16, whether the third discriminating step is used for compensating the discriminated result of the second discriminating means.

18. The method as claimed in claim 17, wherein the information is time information previously recorded on the optical disc.

* * * * *

UNITED STATES PATENT AND TRADEMARK OFFICE
CERTIFICATE OF CORRECTION

PATENT NO. : 6,249,499 B1
DATED : June 19, 2001
INVENTOR(S) : Junichi Andoh

It is certified that error appears in the above-identified patent and that said Letters Patent is hereby corrected as shown below:

Column 1,
Line 9, change "descriminating" to -- discriminating --

Column 3,
Line 1, change "inventin" to -- invention --

Column 11,
Line 45, change "PEEK" to read -- PEAK --
Line 48, change "PEEK" to read -- PEAK --

Signed and Sealed this

Twenty-sixth Day of February, 2002

Attest:

Attesting Officer

JAMES E. ROGAN
Director of the United States Patent and Trademark Office